United States Patent
Schumacher et al.

(10) Patent No.: US 8,728,227 B2
(45) Date of Patent: *May 20, 2014

(54) HIGH-GLOSS MULTILAYER EFFECT PIGMENTS HAVING A SILVER INTERFERENCE COLOR AND A NARROW SIZE DISTRIBUTION, AND METHOD FOR THE PRODUCTION THEREOF

(75) Inventors: Dirk Schumacher, Pegnitz (DE); Michael Grüner, Auerbach (DE); Günter Kaupp, Neuhaus (DE)

(73) Assignee: Eckart GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/131,671

(22) PCT Filed: Aug. 9, 2010

(86) PCT No.: PCT/EP2010/004867
§ 371 (c)(1),
(2), (4) Date: Jun. 8, 2011

(87) PCT Pub. No.: WO2011/020572
PCT Pub. Date: Feb. 24, 2011

(65) Prior Publication Data
US 2011/0226161 A1    Sep. 22, 2011

(30) Foreign Application Priority Data
Aug. 19, 2009  (DE) .......................... 10 2009 037 935

(51) Int. Cl.
*C04B 14/20* (2006.01)

(52) U.S. Cl.
USPC ........... 106/417; 106/400; 106/436; 106/456; 106/482; 106/489

(58) Field of Classification Search
None
See application file for complete search history.

(56) References Cited

U.S. PATENT DOCUMENTS 3,331,699 A   7/1967   Marshall et al.
4,128,435 A   12/1978  Bäumer et al.

(Continued)

FOREIGN PATENT DOCUMENTS

CN    1631997 A    6/2005
CN    1903950 A    1/2007

(Continued)

OTHER PUBLICATIONS

Lewis, Peter A. "Colorants: Organic and Inorganic Pigments" Color for Science, Art and Technology, Chapter 10; Elsevier Science B.V.; K. Nassau (editor) (1998) pp. 283-312.*

(Continued)

*Primary Examiner* — Kaj K Olsen
*Assistant Examiner* — Ross J Christie
(74) *Attorney, Agent, or Firm* — Ostrolenk Faber LLP

(57) ABSTRACT

Multilayer pearlescent pigments with a silver interference color, based on platelet-shaped transparent substrates with an optically active coating, where the optically active coating includes at least
a) a high-index layer A having a refractive index n ≥ 1.8
b) a low-index layer B having a refractive index n < 1.8
c) a high-index layer C having a refractive index n ≥ 1.8
and also
d) optionally an outer protective layer D.
The multilayer pearlescent pigments have the indices $D_{10}$, $D_{50}$, $D_{90}$ from the cumulative frequency distribution of the volume-averaged size distribution function, with a span ΔD of 0.7 -1.4, the span ΔD being calculated in accordance with the formula $\Delta D = (D_{90} - D_{10})/D_{50}$. The invention further relates to a method for producing these multilayer pearlescent pigments, and also to their use.

13 Claims, 6 Drawing Sheets

(56) References Cited

U.S. PATENT DOCUMENTS

| | | | |
|---|---|---|---|
| 5,653,792 A | 8/1997 | Phillips et al. | |
| 5,958,125 A | 9/1999 | Schmid et al. | |
| 6,132,504 A | 10/2000 | Kuntz et al. | |
| 6,139,614 A | 10/2000 | Schmid et al. | |
| 6,596,070 B1 | 7/2003 | Schmidt et al. | |
| 6,648,957 B1* | 11/2003 | Andes et al. | 106/415 |
| 6,689,205 B1 | 2/2004 | Bruckner et al. | |
| 6,747,073 B1* | 6/2004 | Pfaff et al. | 106/403 |
| 6,767,633 B2 | 7/2004 | Steudel et al. | |
| 6,840,993 B2 | 1/2005 | Schmidt et al. | |
| 6,949,138 B2 | 9/2005 | Nakamura et al. | |
| 7,077,897 B2 | 7/2006 | Brueckner et al. | |
| 7,344,590 B2 | 3/2008 | Schmidt et al. | |
| 7,396,401 B2 | 7/2008 | Jungnitz et al. | |
| 7,517,404 B2 | 4/2009 | Bujard et al. | |
| 7,594,962 B2 | 9/2009 | Bujard et al. | |
| 7,691,196 B2 | 4/2010 | Pfaff et al. | |
| 2003/0092815 A1* | 5/2003 | Steudel et al. | 524/442 |
| 2004/0170838 A1 | 9/2004 | Ambrosius et al. | |
| 2005/0013934 A1* | 1/2005 | Xiong et al. | 106/417 |
| 2005/0147724 A1 | 7/2005 | Schweinfurth | |
| 2006/0032404 A1 | 2/2006 | Kniess | |
| 2006/0042507 A1 | 3/2006 | Bujard et al. | |
| 2006/0042509 A1 | 3/2006 | Henglein et al. | |
| 2006/0088488 A1* | 4/2006 | Brun | 424/70.1 |
| 2006/0223910 A1 | 10/2006 | Bagala, Sr. | |
| 2006/0225609 A1* | 10/2006 | Rueger et al. | 106/31.9 |
| 2006/0257662 A1 | 11/2006 | Bujard et al. | |
| 2007/0015012 A1* | 1/2007 | Bujard et al. | 428/845.1 |
| 2007/0032574 A1* | 2/2007 | Kaupp | 106/415 |
| 2007/0199478 A1 | 8/2007 | Schlegl et al. | |
| 2007/0259182 A1 | 11/2007 | Bujard et al. | |
| 2008/0014321 A1 | 1/2008 | Schweinfurth et al. | |
| 2008/0168924 A1 | 7/2008 | Melson et al. | |
| 2008/0279796 A1 | 11/2008 | Handrosch et al. | |
| 2009/0056591 A1* | 3/2009 | Schmidt et al. | 106/415 |
| 2009/0169499 A1 | 7/2009 | Bujard et al. | |
| 2009/0246294 A1* | 10/2009 | Hochstein et al. | 106/439 |
| 2009/0252772 A1* | 10/2009 | Henglein et al. | 424/401 |
| 2009/0258251 A1 | 10/2009 | Abe et al. | |
| 2009/0311209 A1 | 12/2009 | Bujard | |
| 2010/0011992 A1* | 1/2010 | Bujard et al. | 106/439 |
| 2010/0047300 A1* | 2/2010 | Kaupp et al. | 424/401 |
| 2010/0116169 A1* | 5/2010 | Kaupp et al. | 106/31.9 |
| 2010/0203093 A1 | 8/2010 | Bujard et al. | |
| 2010/0297045 A1* | 11/2010 | Kaupp et al. | 106/400 |
| 2011/0226161 A1* | 9/2011 | Schumacher et al. | 106/417 |
| 2011/0265689 A1* | 11/2011 | Schumacher et al. | 106/417 |
| 2011/0265690 A1* | 11/2011 | Schumacher et al. | 106/417 |

FOREIGN PATENT DOCUMENTS

| | | |
|---|---|---|
| DE | 197 07 805 A1 | 9/1998 |
| DE | 197 46 067 A1 | 4/1999 |
| DE | 198 31 869 A1 | 1/2000 |
| DE | 103 13 978 A1 | 10/2004 |
| DE | 103 15 775 A1 | 10/2004 |
| DE | 10 2004 041 586 A1 | 3/2006 |
| DE | 10 2007 010 986 A1 | 9/2008 |
| EP | 0 289 240 A1 | 11/1988 |
| EP | 0 753 545 A2 | 1/1997 |
| EP | 0 881 998 B1 | 12/1998 |
| EP | 1 213 330 A1 | 6/2002 |
| EP | 1 980 594 A1 | 10/2008 |
| JP | 07-246366 | 9/1995 |
| JP | A-2000-044834 | 2/2000 |
| JP | A-2000-281932 | 10/2000 |
| JP | 2000-319540 A | 11/2000 |
| JP | A-2004-532284 | 10/2004 |
| JP | A-2005-502738 | 1/2005 |
| JP | A-2005-042112 | 2/2005 |
| JP | A-2007-126643 | 5/2007 |
| JP | A-2007-327059 | 12/2007 |
| JP | A-2008-174698 | 7/2008 |
| JP | A-2008-546880 | 12/2008 |
| WO | WO 98/53011 | 11/1998 |
| WO | WO 99/20695 | 4/1999 |
| WO | WO 01/77235 A1 | 10/2001 |
| WO | WO 02/090448 A2 | 11/2002 |
| WO | WO 03/006558 A2 | 1/2003 |
| WO | WO 03/063616 A1 | 8/2003 |
| WO | WO 2004/055119 A1 | 7/2004 |
| WO | WO 2004/056716 A1 | 7/2004 |
| WO | WO 2004/067645 A2 | 8/2004 |
| WO | WO 2005/063637 A1 | 7/2005 |
| WO | WO 2006/018196 A1 | 2/2006 |
| WO | WO 2006/021386 A1 | 3/2006 |
| WO | WO 2006/088759 A1 | 8/2006 |
| WO | WO 2006/110359 A2 | 10/2006 |
| WO | WO 2006110359 A2 * | 10/2006 |
| WO | WO 2007/128576 A2 | 11/2007 |
| WO | WO 2008/122420 A1 | 10/2008 |
| WO | WO 2009/103322 A1 | 8/2009 |

OTHER PUBLICATIONS

International Preliminary Report on Patentability dated Feb. 21, 2012 in corresponding International Application No. PCT/EP2010/004867.

German Search Report dated Aug. 5, 2011 in corresponding German Application No. 10 2009 037 934.7.

BYK-Gardner Catalogue, 2007/2008 (p. 14) (with English translation).

German Search Report in corresponding German Patent Application No. 10 2009 037 935.5 dated Mar. 3, 2010 (German).

Notice of Reasons for Rejection dated Sep. 11, 2012 in corresponding Japanese Patent Application No. 2012-525074 (with English language translation).

Decision of Refusal dated May 14, 2013 in corresponding Japanese Patent Application No. 2012-525074 (English language translation).

Office Action dated Apr. 4, 2013 in U.S. Appl. No. 13/143,386.

Office Action dated Mar. 27, 2013 in U.S. Appl. No. 13/142,520.

Office Action dated Mar. 27, 2013 in U.S. Appl. No. 13/143,378.

Office Action dated Jul. 25, 2013 in corresponding Chinese Patent Application No. 201080005210X (with English language translation).

Notice of Reasons for Rejection dated Dec. 3, 2013 in corresponding Japanese Patent Application No. 2012-525071 (with English language translation).

Notice of Reasons for Rejection dated Dec. 3, 2013 in corresponding Japanese Patent Application No. 2012-525072 (with English language translation).

* cited by examiner

Figure 3: Effect of particle properties on laser diffraction

Particle properties:
d: diameter
1: diffraction
2: refraction
3: reflection
4: absorption

HIGH-GLOSS MULTILAYER EFFECT PIGMENTS HAVING A SILVER INTERFERENCE COLOR AND A NARROW SIZE DISTRIBUTION, AND METHOD FOR THE PRODUCTION THEREOF

CROSS REFERENCE TO RELATED APPLICATIONS

The present application is a 35 U.S.C. §371 National Phase conversion of PCT/EP2010/004867, filed Aug. 9, 2010, which claims benefit of German Application No. 10 2009 037 935.5, filed Aug. 19, 2009, the disclosure of which is incorporated herein by reference. The PCT International Application was published in the German language.

TECHNICAL FIELD

The present invention relates to highly lustrous multilayer pearlescent pigments with a silver interference color, to a method for producing them, and to the use thereof in cosmetic formulations, plastics, films, textiles, ceramic materials, glasses, and coating compositions such as paints, printing inks, liquid inks, varnishes or powder coatings.

BACKGROUND

Pearlescent pigments with a silver interference color are commonly produced by coating transparent substrates of low refractive index with a thin $TiO_2$ layer.

Silver-colored luster pigments based on multiply coated platelet-shaped substrates are known from EP 1 213 330 A1. Here, between two high-index $TiO_2$ layers with a layer thickness of 50 to 200 nm, a low-index layer with a layer thickness of 10 to 300 nm is applied to the substrate that is to be coated. The outer high-index layer may optionally be provided with a protective layer in order to increase stability with respect to light, temperature, and weather. From the examples it is apparent that the gloss of the inventive examples increases by 1.3 to 2.9 gloss units in comparison to a commercially available pearlescent pigment.

Goniochromatic luster pigments are described in EP 0 753 545 B2. At least one layer stack comprising a colorless low-index coating and a reflecting, selectively or nonselectively absorbing coating, and also, optionally, an outer protective layer, is applied here to a multiply coated, high-index, non-metallic, platelet-shaped substrate. The layer thickness of the low-index colorless coating reduces as the number of layer stacks applied to the substrate increases. The goniochromatic luster pigments exhibit an angle-dependent color change between two or more intense interference colors.

In accordance with WO 2004/067645 A2, a transparent substrate is coated with an uneven number—at least three—of layers of high and low refractive index in alternation. The difference in refractive index between the adjacent layers is at least 0.2. At least one of the layers differs in its optical thickness from the others. The resulting multilayer effect pigments therefore do not possess a layer construction in which the optical thickness of each layer is an uneven multiple of a quarter of the light wavelength for interference (no "quarter-wave-stack" construction).

In WO 2006/088759 A1, the multilayer effect pigments are coated with titanium dioxide, with a low-index layer having an optical layer thickness of at least 150 nm, and then again with a high-index layer comprising titanium dioxide, with an optical layer thickness of approximately 45 to 240 nm. The first titanium dioxide layer gives the substrate a silvery luster, whereas the resulting multilayer effect pigments do not possess a silvery luster. On account of the optical layer thickness of the low-index layer, the multilayer effect pigments possess a color flop. Here as well, in the same way as for WO 2004/067645 A2, the adjacent layers have a refractive index difference of at least 0.2. Again, the intention is not to have a layer construction in which the optical thickness of each layer is an uneven multiple of a quarter of the light wavelength for interference (no "quarter-wave-stack" construction).

Multilayer interference pigments with strong interference colors and/or with a strong angular dependency of the interference colors, consisting of a transparent base material coated with alternating layers of metal oxides of low and high refractive index, are described in EP 0 948 572 B1. The difference in the refractive indices is at least 0.1. The number and thickness of the layers are dependent on the desired effect and on the substrate used. Considering the construction $TiO_2$—$SiO_2$—$TiO_2$ on a mica substrate, for example, pigments with a blue interference color are obtained when optically thin $TiO_2$ and $SiO_2$ layers with a layer thickness <100 nm are used, said pigments being more strongly colored than pure $TiO_2$-mica pigments. The incidence of thick $SiO_2$ layers with a layer thickness >100 nm produces pigments having a strongly pronounced angular dependency of the interference color.

JP 07246366 describes an optical interference material which is constructed from alternating layers of high and low refractive index, the optical thickness of each layer being an uneven multiple of a quarter of the light wavelength for interference ("quarter-wave-stack" construction).

Interference pigments based on multiply coated, platelet-shaped substrates which have at least a layer sequence comprising a high-index layer, a low-index colorless layer, a nonabsorbing high-index layer, and optionally an outer protective layer, can be produced in accordance with EP 1 025 168. Between the substrate and the first layer, and/or between the individual layers, there may be further colored or colorless metal oxide layers. The interference pigments may comprise two or more identical or different combinations of layer stacks, but the covering of the substrate with just one layer stack is preferred. In order to intensify the color flop, the interference pigments may comprise up to four layer stacks, but the thickness of all the layers on the substrate ought not to exceed 3 µm.

Multilayer pigments based on glass flakes which are coated with at least three alternating layers of high and low refractive index are described in WO 2003/006558 A2. The glass flakes here possess a thickness of <1 µm. In addition to intense colors, the multilayer pigments exhibit a strong color flop.

WO 2004/055119 A1 describes interference pigments based on coated, platelet-shaped substrates. The substrates in this case are covered with a first layer of $SiO_2$, over which is applied, subsequently, a high-index layer, consisting for example of $TiO_2$, $ZrO_2$, $SnO_2$, $Cr_2O_3$, $Fe_2O_3$ or $Fe_3O_4$, or an interference system comprising alternating high-index and low-index layers. The pigments may optionally also have an outer protective layer. In this way, silver-white interference pigments, or interference pigments with brilliant interference colors, are obtained, which are notable for performance properties, such as mechanical stability and photo stability, but which do not have a high gloss. The color of the interference pigments is not dependent or is only minimally dependent on the angle.

Thermally and mechanically stable effect pigments based on thin glass platelets with a thickness ≤1.0 µm are known from WO 2002/090448 A2. The effect pigments may be covered with one or more high-index and/or low-index layer(s). The glass flakes possess a softening temperature of ≥800° C.

The optical properties of effect pigments can be influenced, according to WO 2006/110359 A2, by a suitable particle size distribution. The glass platelets described here, classified and coated with a single metal oxide layer, have a $D_{10}$ of at least 9.5 μm, preferably of 9.5 μm. A disadvantage is that the pigments have to have a size range with a $D_{90}$ of not more than 85 μm, preferably of about 45 μm.

SUMMARY

The object of the present invention is to provide highly lustrous multilayer pearlescent pigments with a silver interference color that exhibit the combination of deep-down luster and transparency that is typical of pearlescent pigments, and that possess increased gloss relative to the multilayer pearlescent pigments known from the prior art. A further object of the invention is to provide a method for producing these multilayer pearlescent pigments.

The object on which the invention is based has been achieved through provision of multilayer pearlescent pigments with a silver interference color, based on platelet-shaped transparent substrates with an optically active coating, where the optically active coating comprises at least a) a high-index layer A having a refractive index n≥1.8
b) a low-index layer B having a refractive index n<1.8
c) a high-index layer C having a refractive index n≥1.8
and also
d) optionally an outer protective layer D
and the multilayer pearlescent pigments have the indices $D_{10}$, $D_{50}$, $D_{90}$ from the cumulative frequency distribution of the volume-averaged size distribution function, with a span ΔD of 0.7-1.4. The span ΔD is calculated in accordance with the formula $\Delta D = (D_{90} - D_{10})/D_{50}$.

Preferred developments are specified in dependent claims 2 to 10.

The object on which the invention is based has additionally been achieved through provision of a method for producing the multilayer pearlescent pigments of the invention, that comprises the following steps:
i) size-classifying the platelet-shaped transparent substrates to be coated
ii) coating the platelet-shaped transparent substrates with at least abovementioned layers A to C and also, optionally, layer D.

Alternatively the platelet-shaped transparent substrates may first be coated with at least abovementioned layers A to C and also, optionally, layer D, and the resulting multilayer pearlescent pigments with a silver interference color may then be classified according to size.

The coating of the platelet-shaped transparent substrates preferably takes place in step ii) after the size-classifying in step i).

Further provided by the invention is the use of the multilayer pearlescent pigments of the invention in cosmetic formulations, plastics, films, textiles, ceramic materials, glasses, and coating compositions, such as paints, printing inks, liquid inks, varnishes, and powder coatings. The invention accordingly provides preparations which comprise the multilayer pearlescent pigments of the invention. The invention is also directed to articles which are provided—coated or printed, for example—with the multilayer pearlescent pigments of the invention. Accordingly, coated articles, such as bodyworks, facing elements, etc., or printed articles, such as paper, card, films, textiles, etc., are likewise part of the present invention.

DETAILED DESCRIPTION

The perception of a color as matt, pale or strong is critically dependent on its color saturation, referred to as the chroma. The chroma is determined by the amount of gray present. The higher the gray content, the lower the color saturation.

Considering a point F in the CIELab color system, it is defined via the three coordinates L* (lightness), a* (red-green axis), and b* (yellow-blue axis). The color coordinates a* and b* may also be expressed by way of polar coordinates C* (chroma) and h* (color angle, color locus), the definition being given as follows:

$$C^* = \sqrt{a^{*2} + b^{*2}}$$

$$h^* = \frac{180}{\pi} \cdot \arctan\left(\frac{b^*}{a^*}\right)$$

Figure 1:
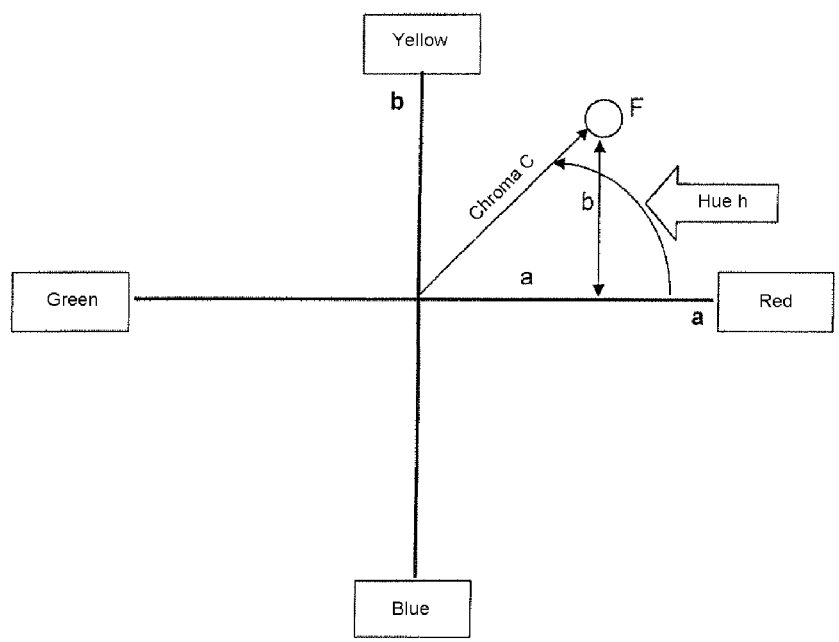
FIG. 1 shows the CIELab color system.

The chroma, therefore, corresponds to the length of the vector which points from the origin of the coordinate system to the point F that is to be defined. The lower the value of C*, the closer the point F to the achromatic, gray region of the color coordinate system. The chroma is therefore the distance from the L* axis or gray axis which is perpendicular to the plane a*,b* (FIG. 1).

Effect pigments which have a silver interference color are distinguished by low chroma values; in other words, the interference colors are achromatic colors. This can also be shown using colorimetric data. Knife drawdowns of glass flakes covered with one (number: 1) $TiO_2$ layer were produced in each case, with silver interference color (MIRAGE Glamour Silver, Eckart), blue interference color (MIRAGE Glamour Blue, Eckart), and red interference color (MIRAGE Glamour Red, Eckart), in a nitrocellulose varnish containing 6% by weight of pigments, the % by weight figure being based on the total weight of the varnish, in a wet film thickness of 76 μm on Byk-Gardner black/white chart (Byko-Chart 2853), and were then dried at room temperature. Colorimetric evaluations were then performed on these charts, using a BYK-MAC (from BYK Gardner).

Considering the colorimetric data for these three selected pigments, it is seen that the silver interference pigment, at an angle of 15° outside the specular, has the lowest chroma value, with a $C^*_{15}$ of 6.0.

TABLE 1

Colorimetric data for glass flakes covered with a TiO₂ layer

| Pigment | Angle | L* | a* | b* | C*₁₅ | h* |
|---|---|---|---|---|---|---|
| MIRAGE Glamour Blue | 15° | 46.3 | 1.5 | −22.9 | 22.9 | 273.7 |
| MIRAGE Glamour Red | 15° | 56.9 | 25.6 | −9.1 | 27.1 | 340.4 |
| MIRAGE Glamour Silver | 15° | 61.4 | −0.7 | −5.9 | 6.0 | 263.5 |

Figure 2:
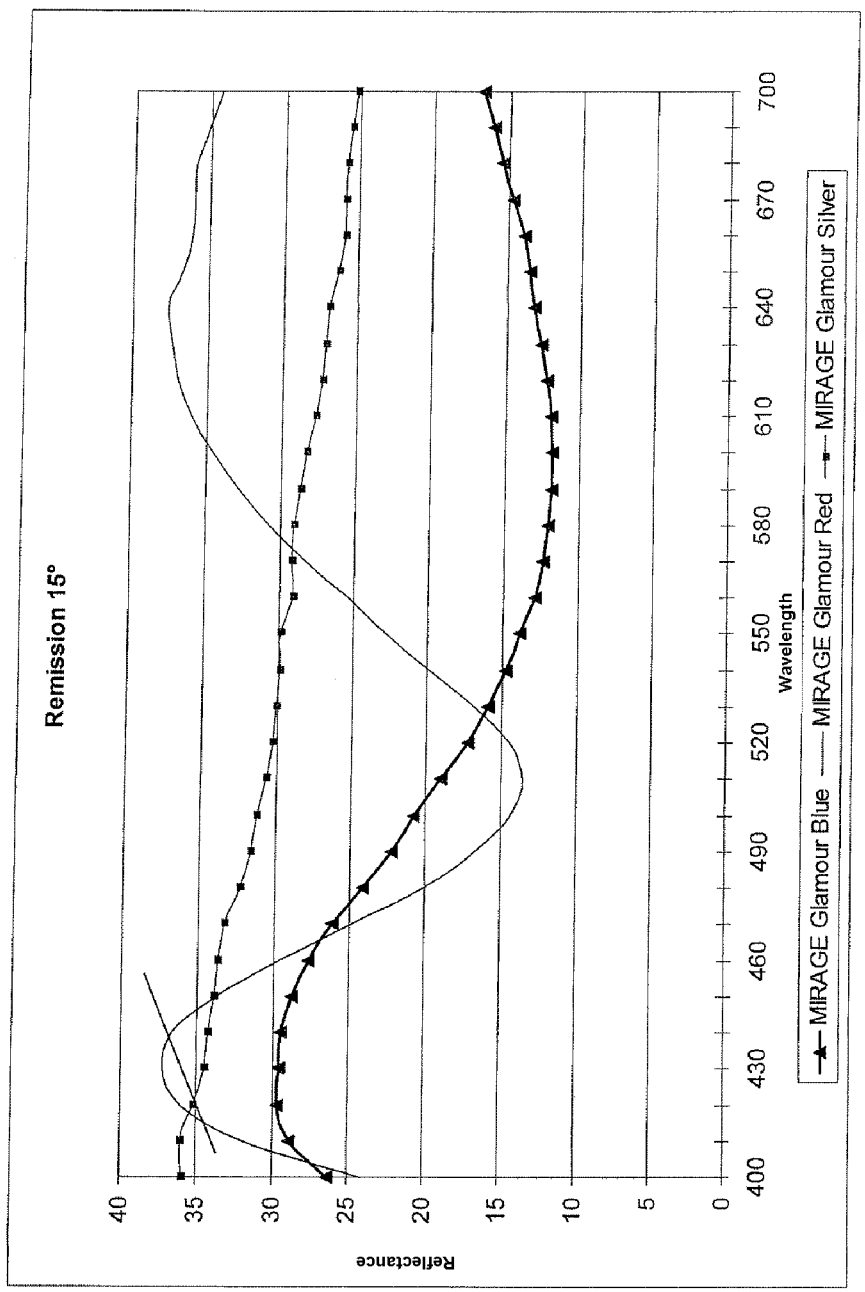
FIG. 2 shows a remission plot obtained with the indicated effect pigments.

The silver-colored interference can also be ascertained by means of a remission plot (FIG. 2). Here, effect pigments with a silver interference color show a largely uniformly high reflectance across the entire visible wavelength range. In contrast, colored interference pigments show minima or maxima in the visible wavelength range. For MIRAGE Glamour Red, for instance, a pronounced maximum is found at about 430 nm and 630 nm, whereas a pronounced minimum can be detected at about 510 nm. This remission behavior results in a highly chromatic, bluish red interference color. In contrast, MIRAGE Glamour Blue shows a maximum at about 430 nm but a minimum at about 600 nm, resulting in a blue interference color. The pearlescent pigment MIRAGE Glamour Silver, in contrast, shows a uniformly high reflectance from about 400 nm to 700 nm, and so in this case there is no color impression produced—instead, a silver interference color is perceived.

EP 1 213 330 A1 discloses multilayer pearlescent pigments with a silver interference color. Relative to single-layer pearlescent pigments, a slightly improved gloss was obtained.

The inventors have surprisingly observed that the multilayer pearlescent pigments of the invention with a span ΔD in the range from 0.7 to 1.4 exhibit an extremely strong gloss.

The size distribution of the multilayer pearlescent pigments is characterized in accordance with the invention by using the span ΔD, defined as $\Delta D=(D_{90}-D_{10})/D_{50}$. The smaller the span, the narrower the size distribution.

Figure 3:
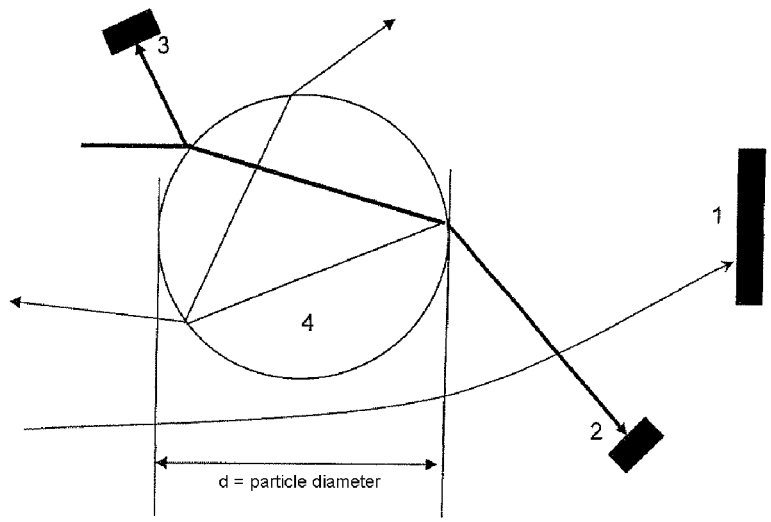
FIG. 3 shows the effect of particle properties on laser diffraction.

The $D_{10}$, $D_{50}$ or $D_{90}$ value in the cumulative frequency distribution of the volume-averaged size distribution function, as is obtained by laser diffraction methods, indicates that 10%, 50%, and 90%, respectively, of the multilayer pearlescent pigments have a diameter which is the same as or smaller than the respectively indicated value. In this case, the size distribution curve is determined using an instrument from Malvern (instrument: Malvern Mastersizer 2000) in accordance with manufacturer indications. In this instrument, the scattered light signals were evaluated in accordance with the theory of Mie, which also includes refraction and absorption behavior on the part of the particles (FIG. 3).

The multilayer pearlescent pigments of the invention possess a span ΔD in a range from 0.7 to 1.4, preferably in a range from 0.7 to 1.3, more preferably in a range from 0.8 to 1.2, very preferably in a range from 0.8 to 1.1. In further-preferred embodiments the span ΔD is in a range from 0.85 to 1.05.

Where the multilayer pearlescent pigments have a span ΔD of more than 1.4, the multilayer pearlescent pigments obtained are not highly lustrous. Multilayer pearlescent pigments below a span ΔD of 0.7 are very complicated to prepare by the usual techniques, and hence can no longer be produced economically.

The span ΔD of the platelet-shaped transparent substrate to be coated corresponds substantially to that of the multilayer pearlescent pigment of the invention and is ≤1.4, preferably ≤1.3, more preferably ≤1.2, very preferably ≤1.1, and especially preferably ≤1.05.

The multilayer pearlescent pigments of the invention may have any desired average particle size ($D_{50}$). The $D_{50}$ values of the multilayer pearlescent pigments of the invention are situated preferably within a range from 3 to 350 μm. The multilayer pearlescent pigments of the invention preferably have a $D_{50}$ value from a range from 3 to 15 μm or from a range from 10 to 35 μm or from a range from 25 to 45 μm or from a range from 30 to 65 μm or from a range from 40 to 140 μm or from a range from 135 to 250 μm.

The $D_{10}$ values of the multilayer pearlescent pigments of the invention encompass preferably a range from 1 to 120 μm. The multilayer pearlescent pigments of the invention preferably have the combinations of $D_{10}$, $D_{50}$, and $D_{90}$ values that are indicated in table 2. In this context, the $D_{10}$, $D_{50}$, and $D_{90}$ values of table 2 are combined only in such a way as to produce a span ΔD from a range from 0.7 to 1.4, preferably from a range from 0.7 to 1.3, more preferably from a range from 0.8 to 1.2, very preferably from a range from 0.8 to 1.1, and especially preferably from a range from 0.85 to 1.05. Combinations of $D_{10}$, $D_{50}$, and $D_{90}$ values that lead to a span ΔD which is not situated in the range from 0.7 to 1.4 are not inventive embodiments.

TABLE 2

Preferred combinations of ranges of the $D_{10}$, $D_{50}$, and $D_{90}$ values

| $D_{10}$ (μm) | $D_{50}$ (μm) | $D_{90}$ (μm) |
|---|---|---|
| 1-5 | 3-15 | 8-25 |
| 5-25 | 10-35 | 20-45 |
| 10-30 | 25-45 | 40-70 |
| 20-45 | 30-65 | 70-110 |
| 25-65 | 40-140 | 120-180 |
| 75-110 | 135-250 | 400-490 |

In this context it has emerged, surprisingly, that the size of the multilayer pearlescent pigments, characterized with the $D_{50}$ value, is not critical, and instead that the span $\Delta D=(D_{90}-D_{10})/D_{50}$ is in a narrow range from 0.7 to 1.4. The $D_{50}$ values of the multilayer pearlescent pigments may be, for example, 15, 20, 25 or 30 μm or else 50, 80, 100, 150, 200, 250, 300 or 350 μm.

Suitable platelet-shaped transparent substrates to be coated are nonmetallic, natural or synthetic platelet-shaped substrates. The substrates are preferably substantially transparent, more preferably transparent, which means that they are at least partly transmissive to visible light.

According to one preferred embodiment of the invention, the platelet-shaped transparent substrates may be selected from the group consisting of natural mica, synthetic mica, glass flakes, SiO₂ platelets, Al₂O₃ platelets, polymer platelets, platelet-shaped bismuth oxychloride, platelet-shaped substrates comprising a hybrid organic-inorganic layer, and mixtures thereof. The platelet-shaped transparent substrates are preferably selected from the group consisting of natural mica, synthetic mica, glass flakes, SiO₂ platelets, Al₂O₃ platelets, and mixtures thereof. With particular preference the platelet-shaped transparent substrates are selected from the group consisting of natural mica, synthetic mica, glass flakes, and mixtures thereof. Especially preferred are glass flakes and synthetic mica, and mixtures thereof.

In contrast to synthetic platelet-shaped transparent substrates, natural mica possesses the disadvantage that contaminations, as a result of incorporated extraneous ions, may alter the hue, and that the surface is not ideally smooth but instead may have irregularities, such as steps, for example. Even when a natural substrate is used, however, it has surprisingly emerged that the luster of a plurality of multilayer pearlescent pigments can be increased when the span ΔD is in a range from 0.7 to 1.4, as compared with a plurality of conventional, broad-span multilayer pearlescent pigments.

Synthetic substrates such as, for example, glass flakes or synthetic mica, in contrast, have smooth surfaces, a uniform thickness within an individual substrate particle, and sharp edges. Consequently the surface offers only a few scattering centers for incident and reflected light, and accordingly, after coating, allows more highly lustrous multilayer pearlescent pigments than with natural mica as substrate. Glass flakes used are preferably those which are produced by the methods described in EP 0 289 240 A1, WO 2004/056716 A1, and WO 2005/063637 A1. The glass flake substrates which can be used may have, for example, a composition in accordance with the teaching of EP 1 980 594 B1.

The average geometric thickness of the platelet-shaped transparent substrates to be coated is in a range from 50 nm to 5000 nm, preferably in a range from 60 nm to 3000 nm, and more preferably in a range from 70 nm to 2000 nm. In one embodiment, the average geometric thickness for glass flakes as the substrate to be coated is in a range from 750 nm to 1500 nm. Glass flakes of this kind are available commercially on a broad basis. Further advantages are offered by thinner glass flakes. The thinner substrates result in a lower overall layer thickness of the multilayer pearlescent pigments of the invention. Preference is therefore likewise given to glass flakes whose average geometric thickness is in a range from 100 nm to 700 nm, more preferably in a range from 150 nm to 600 nm, very preferably in a range from 170 nm to 500 nm, and especially preferably in a range of 200 nm to 400 nm. In another embodiment, the average geometric thickness for natural or synthetic mica as the substrate to be coated is preferably in a range from 100 nm to 700 nm, more preferably in a range from 150 nm to 600 nm, very preferably in a range from 170 nm to 500 nm, and especially preferably in a range from 200 nm to 400 nm.

If platelet-shaped transparent substrates below an average geometric thickness of 50 nm are coated with high-index metal oxides, then the multilayer pearlescent pigments obtained are extremely fracture-sensitive, and may completely fragment even during incorporation into the application medium, with the consequence of a significant reduction in luster.

Above an average geometric substrate thickness of 5000 nm, the multilayer pearlescent pigments may become too thick overall. This is accompanied by a poorer specific opacity, i.e., surface area hidden per unit weight of multilayer pearlescent pigment of the invention, and also by a lower plane-parallel orientation in the application medium. The result of a poorer orientation, in turn, is a reduced luster.

The average geometric thickness of the platelet-shaped transparent substrate is determined on the basis of a cured varnish film in which the multilayer pearlescent pigments are aligned substantially plane-parallel to the substrate. For this purpose, a ground section of the cured varnish film is investigated under a scanning electron microscope (SEM), the geometric thickness of the platelet-shaped transparent substrate of 100 multilayer pearlescent pigments being determined and averaged statistically.

The multilayer pearlescent pigments of the invention are prepared by providing the platelet-shaped substrates with at least one optically active coating which comprises
 a) a high-index layer A having a refractive index $n \geq 1.8$
 b) a low-index layer B having a refractive index $n<1.8$
 c) a high-index layer C having a refractive index $n \geq 1.8$
and also
 d) optionally an outer protective layer D. The layers A and B, and B and C, may be applied multiply below the outer protective layer D. It is preferred to apply, always in alternation, high-index and low-index layers to the substrate. With particular preference the platelet-shaped transparent substrate is coated only once with the layers A to C, optionally D.

In accordance with the invention, the layer A is internal in the layer arrangement, i.e., is facing the platelet-shaped transparent substrate; the layer B is situated between the layer A and the layer C, and the layer C, based on the platelet-shaped transparent substrate, is external in the layer arrangement.

Between the platelet-shaped transparent substrate and the layer A there may be one or more further, preferably substantially transparent, layers arranged. According to one preferred development, the layer A is applied directly to the platelet-shaped transparent substrate.

Between the layer A and the layer B, and also between the layer B and the layer C, there may be arranged, independently of one another, one or more further, preferably substantially transparent, layers. According to one preferred development, the layer B is applied directly to the layer A. According to another preferred development, the layer C is applied directly to the layer B.

With especial preference, the layer A is applied directly to the platelet-shaped transparent substrate, the layer B directly to the layer A, the layer C directly to the layer B, and also, optionally, layer D directly to the layer C.

As optically active layers or coatings it is preferred to apply layers which comprise metal oxides, metal oxide hydrates, metal hydroxides, metal suboxides, metals, metal fluorides, metal oxyhalides, metal chalcogenides, metal nitrides, metal oxynitrides, metal sulfides, metal carbides or mixtures thereof. According to one preferred variant, the optically active layers or coatings consist of the aforementioned materials.

The terms layers or coatings are used interchangeably for the purposes of this invention, unless otherwise indicated.

The refractive index of the high-index layers A and C is in each case $n \geq 1.8$, preferably $n \geq 1.9$, and more preferably $n \geq 2.0$. The refractive index of the low-index layer B is $n<1.8$, preferably $n<1.7$, and more preferably $n<1.6$.

Suitability for the high-index layer A or C is possessed by selectively and/or nonselectively absorbing and/or nonabsorbing materials.

Examples of suitable high-index, selectively absorbing materials include
 colored metal oxides or metal oxide hydrates such as iron (III) oxide ($\alpha$- and/or $\gamma$-$Fe_2O_3$, red), FeO(OH) (yellow), chromium(III) oxide (green), titanium(III) oxide ($Ti_2O_3$, blue), vanadium pentoxide (orange),
 colored nitrides such as titanium oxynitrides and titanium nitride ($TiO_xN_y$, TiN, blue), the lower titanium oxides and nitrides generally being present in a mixture with titanium dioxide,
 metal sulfides such as cerium sulfide (red),
 iron titanates such as pseudobrookite (brownish red) and/or pseudorutile (brownish red),
 tin-antimony oxide $Sn(Sb)O_2$,
 nonabsorbing, colorless, high-index materials, e.g., metal oxides such as titanium dioxide and zirconium dioxide that are colored with selectively absorbing colorants. This coloration may be accomplished by incorporation of colorants into the metal oxide layer, by the doping thereof with selectively absorbing metal cations or colored metal oxides such as iron(III) oxide, or by coating of the metal oxide layer with a film comprising a colorant.

Examples of high-index, nonselectively absorbing materials include metals such as molybdenum, iron, tungsten, chromium, cobalt, nickel, silver, palladium, platinum, mixtures thereof or alloys thereof, metal oxides such as magnetite $Fe_3O_4$, cobalt oxide (CoO and/or $Co_3O_4$), vanadium oxide ($VO_2$ and/or $V_2O_3$), and also mixtures of these oxides with metals, more particularly magnetite and (metallic) iron, iron titanates such as ilmenite, metal sulfides such as molybdenum sulfide, iron sulfide, tungsten sulfide, chromium sulfide, cobalt sulfide, nickel sulfide, silver sulfide, tin sulfide, mixtures of these sulfides, mixtures of these sulfides with the respective metal, such as $MoS_2$ and Mo, and mixtures with oxides of the respective metal, such as $MoS_2$ and molybdenum oxides, nonabsorbing, colorless, high-index layers such as titanium dioxide or zirconium dioxide into which nonselectively absorbing material (e.g., carbon) has been incorporated or which are coated therewith.

The high-index, nonabsorbing materials include, for example, metal oxides such as titanium dioxide, zirconium dioxide, zinc oxide, tin dioxide, antimony oxide, and mixtures thereof, metal hydroxides, metal oxide hydrates, metal sulfides such as zinc sulfide, metal oxyhalides such as bismuth oxychloride.

The layers A and/or C may in each case also be mixtures of different selectively and/or nonselectively absorbing components, preferably metal oxides. For example, the different components, preferably metal oxides, may be present in the form of a homogeneous mixture. It is also possible, however, for one component to be present in the other component in the form of a dope.

For example, in the layer A and/or C, there may be a nonabsorbing component present, titanium oxide for example, preferably $TiO_2$, as a dope in a selectively absorbing component, preferably $Fe_2O_3$, and/or in a nonselectively absorbing component, $Fe_3O_4$ for example. Alternatively, a selectively absorbing component, $Fe_2O_3$ for example, and/or a nonselectively absorbing component, $Fe_3O_4$ for example, may be present as a dope in a nonabsorbing component, titanium oxide for example, preferably $TiO_2$.

One preferred embodiment uses metal oxides, metal hydroxides and/or metal oxide hydrates as high-index layer A and/or C. Particular preference is given to the use of metal oxides. With very particular preference, the layer A and/or C comprises titanium dioxide and/or iron oxide and also mixtures thereof. In one embodiment, the layer A and/or C is composed of titanium dioxide and/or iron oxide and also mixtures thereof.

Where the multilayer pearlescent pigments of the invention have a coating with titanium dioxide, the titanium dioxide may be present in the rutile or anatase crystal modification. The titanium dioxide layer is preferably in the rutile form. The rutile form can be obtained by, for example, applying a layer of tin dioxide to the platelet-shaped transparent substrate to be coated, before the titanium dioxide layer is applied. Titanium dioxide crystallizes in the rutile modification on this layer of tin dioxide. This tin dioxide may take the form of a separate layer, in which case the layer thickness may be a few nanometers, as for example less than 10 nm, more preferably less than 5 nm, even more preferably less than 3 nm.

Nonabsorbing materials are suitable as low-index layer B. These materials include, for example, metal oxides such as silicon dioxide, aluminum oxide, boron oxide, metal oxide hydrates such as silicon oxide hydrate, aluminum oxide hydrate, metal fluorides such as magnesium fluoride, $MgSiO_3$.

The low-index metal oxide layer may optionally comprise alkali metal oxides and/or alkaline earth metal oxides as constituents.

The low-index layer B preferably comprises silicon dioxide. In one embodiment, the low-index layer B consists of silicon dioxide.

The interference-capable coating may either envelop the substrate completely or may be present only partially on the substrate. The multilayer pearlescent pigments of the invention are distinguished by the uniform, homogeneous construction of the coating which envelops the platelet-shaped substrate completely and covers not only its top and bottom faces.

The optical thickness of the nonmetallic layers with high and low refractive indices determines the optical properties of the multilayer pearlescent pigments. In the case of the multilayer pearlescent pigments of the invention with a silver interference color, the thickness of the individual layers is preferably harmonized with one another.

If n is the refractive index of a layer and d is its thickness, the interference color in which a thin layer appears is given by the product of n and d, i.e., the optical thickness. The colors of such a film that come about in the reflecting light under normal light incidence result from a strengthening of the light of the wavelength $$\lambda = \frac{4}{2N-1} \cdot nd$$

and by attenuation of light of the wavelength $$\lambda = \frac{2}{N} \cdot nd,$$

where N is a positive integer. The variation in color that occurs with increasing film thickness results from the strengthening or attenuation of particular wavelengths of the light through interference.

In the case of multilayer pigments, the interference color is determined by the strengthening of particular wavelengths, and, if two or more layers in a multilayer pigment possess the same optical thickness, the color of the reflecting light becomes more intense as the number of layers increases.

The multilayer pigments of the invention with a silver interference color may have optical layer thicknesses of the high-index layers A and C which are in each case in the range from 50 nm to 200 nm, preferably in the range from 95 nm to 180 nm, and more preferably in the range from 110 nm to 165 nm. The optical layer thickness of the low-index layer B may be in a range from 30 nm to 150 nm, preferably in a range from 70 nm to 150 nm, and more preferably in a range from 100 nm to 150 nm.

In the case of metals, the geometric layer thicknesses of the layer A and/or C are 10 nm to 50 nm, preferably 15 nm to 30 nm. The layer thicknesses must be set such that the layers have semitransparent properties. Depending on the metal used, this may result in different layer thicknesses.

The coating ought to be at least partially transmissive to visible light (semitransparent), and therefore differs in thickness as a function of the optical properties of the layer materials selected. The layer thicknesses indicated in this application are, unless otherwise indicated, the optical layer thicknesses. By an optical layer thickness is meant, in accordance with the invention, the product of geometric layer thickness and the refractive index of the material which constitutes the layer. As the value for the refractive index of the material in question, the value known in each case from the literature is used. In accordance with the invention, the geometric layer thickness is determined on the basis of SEM micrographs of ground sections of varnishes containing multilayer pearlescent pigments oriented plane-parallel to the substrate.

The optical layer thicknesses of the multilayer pearlescent pigments of the invention may be set such that both layer A and layer C per se already induce a silver appearance. Alternatively, these two layers, each considered per se, may also have a nonsilver appearance. It is important that the interference color of the fully coated multilayer pearlescent pigments of the invention is silver.

Multilayer pearlescent pigments with a silver interference color are understood for the purposes of this invention to be multilayer pearlescent pigments whose chroma values $C^*_{15}$ are ≤20, preferably ≤19, more preferably ≤18, and very preferably ≤17. The chroma values $C^*_{15}$ of the multilayer pearlescent pigments of the invention are preferably in a range from 1 to ≤20, more preferably in a range from 2 to ≤19, more preferably in a range from 3 to ≤18, and with particular preference in a range from 4 to ≤17. The multilayer pearlescent pigments may in this case, in addition to their silver interference color, when viewed from outside of the specular angle, have a colored appearance. This colored appearance may be induced, depending on the nature of the coating of the platelet-shaped transparent substrate, by the inherent color of the coating material and by its layer thickness. On account of the high luster, any absorption color possibly present will be outshone at the specular angle, and the overall appearance of the multilayer pearlescent pigment of the invention will be presented to the viewer as silver-colored. In other embodiments, the silver interference color may also have a slightly pastel hue at the specular angle, but the observer here perceives a predominantly silver appearance.

The chroma values here are determined from the following applications: a nitrocellulose varnish (Dr. Renger Erco Bronzemischlack 2615e; Morton) containing 6% by weight of multilayer pearlescent pigments, the % by weight figure being based on the total weight of the varnish, is applied, depending on $D_{50}$ value, in a wet film thickness in accordance with table 3, to BYK-Gardner black/white drawdown charts (Byko-Chart 2853), and subsequently dried at room temperature. Then, using a BYK-MAC (BYK Gardner), colorimetric evaluations are performed on these drawdown charts, with measurement taking place on the black background of the drawdown chart. The incident angle is 45° and the chroma value employed is that at an observation angle of 15°.

TABLE 3

Wet film thickness as a function of the $D_{50}$ value of the multilayer pearlescent pigments

| $D_{50}$ value | Wire doctor |
|---|---|
| <40 µm | 36 µm |
| 40 µm-85 µm | 76 µm |
| >85 µm | 100 µm |

The multilayer pearlescent pigments of the invention are not goniochromatic—that is, they do not exhibit any angle-dependent change in the interference color.

The multilayer pearlescent pigments may additionally be provided with at least one outer protective layer D, which further increases the stability of the multilayer pearlescent pigment with respect to light, weather and/or chemicals. The outer protective layer D may also be an aftercoat which facilitates the handling of the pigment on incorporation into different media.

The outer protective layer D of the multilayer pearlescent pigments of the invention may comprise or, preferably, consist of one or two metal oxide layers of the elements Si, Al or Ce. In one variant a silicon oxide layer, preferably $SiO_2$ layer, is applied as outermost metal oxide layer. Particular preference here is given to a sequence in which first of all a cerium oxide layer is applied, which is then followed by an $SiO_2$ layer, as described in WO 2006/021386 A1, the content of which is hereby incorporated by way of reference.

The outer protective layer D may additionally be organic-chemically modified on the surface. For example, one or more silanes may be applied to this outer protective layer. The silanes may be alkylsilanes having branched or unbranched alkyl radicals having 1 to 24 C atoms, preferably 6 to 18 C atoms.

The silanes may alternatively be organofunctional silanes which allow chemical attachment to a plastic, a binder of a paint or of an ink, etc.

The organofunctional silanes which are used preferably as surface modifiers and which have suitable functional groups are available commercially and are produced, for example, by Evonik and sold under the trade name "Dynasylan". Further products may be purchased from Momentive (Silquest silanes) or from Wacker, examples being standard silanes and α-silanes from the GENIOSIL product group.

Examples of these products are 3-methacryloyloxypropyl-trimethoxysilane (Dynasylan MEMO, Silquest A-174NT), vinyltri(m)ethoxysilane (Dynasylan VTMO or VTEO, Silquest A-151 or A-171), methyltri(m)ethoxysilane (Dynasylan MTMS or MTES), 3-mercaptopropyltrimethoxy-silane (Dynasylan MTMO; Silquest A-189), 3-glycidyloxy-propyltrimethoxysilane (Dynasylan GLYMO, Silquest A-187), tris [3-(trimethoxysilyl)propyl]isocyanurate (Silquest Y-11597), bis[3-(triethoxysilyl)propyl)]tetrasulfide (Silquest A-1289), bis[3-(triethoxysilyl)propyl disulfide (Silquest A-1589, beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl (m)-ethyldimethoxysilane (GENIOSIL XL 32, XL 34), (isocyanatomethyl)methyldimethoxysilane, (isocyanatomethyl)trimethoxysilane, 3-(triethoxysilyl)propyl-succinic anhydride (GENIOSIL GF 20), (methacryloyloxy-methyl)methyldiethoxysilane, 2-acryloyloxyethylmethyldimethoxysilane, 2-methacryloyloxyethyltrimethoxysilane, 3-acryloyloxypropylmethyldimethoxysilane, 2-acryloyloxyethyltrimethoxysilane, 2-methacryloyloxyethyltriethoxysilane, 3-acryloyloxypropyltrimethoxysilane, 3-acryloyloxypropyltripropoxysilane, 3-methacryloyloxypropyltriethoxysilane, 3-methacryloyloxypropyltriacetoxysilane, 3-methacryloyloxypropylmethyldimethoxysilane, vinyltrichlorosilane, vinyltrimethoxysilane (GENIOSIL XL 10), vinyltris(2-methoxyethoxy)silane (GENIOSIL GF 58), and vinyltriacetoxysilane.

As organofunctional silanes it is preferred to use 3-methacryloyloxypropyltrimethoxysilane (Dynasylan MEMO, Silquset A-174NT), vinyltri(m)ethoxysilane (Dynasylan VTMO or VTEO, Silquest A-151 or A-171), methyltri(m)ethoxysilane (Dynasylan MTMS or MTES), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxy-methyltri(m)ethoxysilane (GENIOSIL XL 33, XL 36), (methacryloyloxymethyl)(m)ethyldimethoxysilane (GENIOSIL XL 32, XL 34), 3-(triethoxysilyl)propyl-succinic anhydride (GENIOSIL GF 20), vinyltrimethoxysilane (GENIOSIL XL 10) and/or vinyltris(2-methoxyethoxy)silane (GENIOSIL GF 58).

It is, however, also possible to apply other organo-functional silanes to the multilayer pearlescent pigments of the invention.

It is additionally possible to use aqueous prehydrolyzates that are obtainable, for example, commercially from Degussa. These include, among others, aqueous aminosiloxane (Dynasylan Hydrosil 1151), aqueous amino-/alkyl-functional siloxane (Dynasylan Hydrosil 2627 or 2909), aqueous diamino-functional siloxane (Dynasylan Hydrosil 2776), aqueous epoxy-functional siloxane (Dynasylan Hydrosil 2926), amino-/alkyl-functional oligosiloxane (Dynasylan 1146), vinyl-/alkyl-functional oligosiloxane (Dynasylan 6598), oligomeric vinylsilane (Dynasylan 6490) or oligomeric short-chain alkyl-functional silane (Dynasylan 9896).

In one preferred embodiment, the organofunctional silane mixture comprises at least one amino-functional silane as well as at least one silane without a functional binding group. The amino function is a functional group which is able to enter into one or more chemical interactions with the majority of groups that are present in binders. This may involve a covalent bond, such as with isocyanate functions or carboxylate functions of the binder, for example, or hydrogen bonds such as with OH functions or COOR functions, or else ionic interactions. An amino function is therefore very highly suitable for the purpose of the chemical attachment of the multilayer pearlescent pigment to different kinds of binders.

For this purpose it is preferred to take the following compounds: 3-aminopropyltrimethoxysilane (Dynasylan AMMO; Silquest A-1110), 3-aminopropyltriethoxysilane (Dynasylan AMEO), [3-(2-aminoethyl)aminopropyl]trimethoxysilane (Dynasylan DAMO, Silquest A-1120), [3-(2-aminoethyl)aminopropyl]triethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-aminopropyltrimethoxysilane (Silquest Y-9669), 4-amino-3,3-dimethylbutyltrimethoxysilane (Silquest A-1637), N-cyclohexyl-aminomethylmethyldiethoxysilane (GENIOSIL XL 924), N-cyclohexylaminomethyltriethoxysilane (GENIOSIL XL 926), N-phenylaminomethyltrimethoxysilane (GENIOSIL XL 973), and mixtures thereof.

In a further-preferred embodiment, the silane without a functional binding group is an alkylsilane. The alkylsilane preferably has the formula (A):

$$R_{(4-z)}Si(X)_z \quad (A)$$

In this formula, z is an integer from 1 to 3, R is a substituted or unsubstituted, unbranched or branched alkyl chain having 10 to 22 C atoms, and X is a halogen group and/or alkoxy group. Preference is given to alkylsilanes having alkyl chains having at least 12 C atoms. R may also be joined cyclically to Si, in which case z is typically 2.

At or on the surface of the multilayer pearlescent pigments of the invention, in addition to the aforementioned silanes and silane mixtures, there may also be further organic-chemical modifiers arranged, such as, for example, substituted or unsubstituted alkyl radicals, polyethers, thioethers, siloxanes, etc., and mixtures thereof. It is, however, also possible for inorganic-chemical modifiers (e.g., $Al_2O_3$ or $ZrO_2$ or mixtures thereof) to be applied to the pigment surface, these modifiers being able, for example, to increase the dispersibility and/or compatibility in the respective application medium.

Via the surface modification it is possible, for example, to modify and/or set the hydrophilicity or hydrophobicity of the pigment surface. For example, via the surface modification, it is possible to modify and/or set the leafing or nonleafing properties of the multilayer pearlescent pigments of the invention. By leafing is meant that, in an application medium, such as a paint or a printing ink, for example, the multi-layer pearlescent pigments of the invention take up a position at or close to the interface or surface of the application medium.

The surface modifiers may also have reactive chemical groups, such as, for example, acrylate, methacrylate, vinyl, isocyanate, cyano, epoxy, hydroxyl or amino groups or mixtures thereof. These chemically reactive groups allow chemical attachment, especially formation of covalent bonds, to the application medium or to components of the application medium, such as binders, for example. By this means it is possible to make improvements in, for example, the chemical and/or physical properties of cured varnishes, paints or printing inks, such as resistance to environmental influences such as humidity, insolation, UV resistance, etc., or with respect to mechanical influences, examples being scratches, etc.

The chemical reaction between the chemically reactive groups and the application medium or components of the application medium may be induced, for example, by irradiation of energy, in the form of UV radiation and/or heat, for example.

For the incorporation of multilayer pearlescent pigments aftercoated with silanes and/or provided with an outer protective layer D into cosmetic formulations it is necessary to ensure that the corresponding silane and/or the material of the outer protective layer D is allowable in accordance with cosmetics law.

In a further embodiment, the present invention comprises multilayer pearlescent pigments with a silver interference color, based on platelet-shaped transparent substrates with an optically active coating, wherein the optically active coating comprises at least a) a high-index nonabsorbing layer A having a refractive index $n \geq 1.8$ b) a low-index nonabsorbing layer B having a refractive index $n < 1.8$ c) a high-index nonabsorbing layer C having a refractive index $n \geq 1.8$ and also d) optionally an outer protective layer D and the multilayer pearlescent pigments have the indices $D_{10}$, $D_{50}$, $D_{90}$ from the cumulative frequency distribution of the volume-averaged size distribution function, with a span $\Delta D$ of 0.8-1.2, the span $\Delta D$ being calculated in accordance with the formula $\Delta D = (D_{90} - D_{10})/D_{50}$.

In a further embodiment, the present invention comprises multilayer pearlescent pigments with a silver interference color, based on platelet-shaped transparent substrates with an optically active coating, wherein the optically active coating comprises at least e) a high-index nonabsorbing layer A having a refractive index $n \geq 1.8$
f) a low-index nonabsorbing layer B having a refractive index $n<1.8$
g) a high-index selectively absorbing layer C having a refractive index $n \geq 1.8$ and also h) optionally an outer protective layer D and the multilayer pearlescent pigments have the indices $D_{10}$, $D_{50}$, $D_{90}$ from the cumulative frequency distribution of the volume-averaged size distribution function, with a span $\Delta D$ of 0.8-1.2, the span $\Delta D$ being calculated in accordance with the formula $\Delta D=(D_{90}-D_{10})/D_{50}$.

In a further embodiment, the present invention comprises multilayer pearlescent pigments with a silver interference color, based on platelet-shaped transparent substrates with an optically active coating, wherein the optically active coating comprises at least i) a high-index selectively absorbing layer A having a refractive index $n \geq 1.8$
j) a low-index nonabsorbing layer B having a refractive index $n<1.8$
k) a high-index nonabsorbing layer C having a refractive index $n \geq 1.8$ and also l) optionally an outer protective layer D and the multilayer pearlescent pigments have the indices $D_{10}$, $D_{50}$, $D_{90}$ from the cumulative frequency distribution of the volume-averaged size distribution function, with a span $\Delta D$ of 0.8-1.2, the span $\Delta D$ being calculated in accordance with the formula $\Delta D=(D_{90}-D_{10})/D_{50}$.

In a further embodiment, the present invention comprises multilayer pearlescent pigments with a silver interference color, based on platelet-shaped transparent substrates with an optically active coating, wherein the optically active coating comprises at least m) a high-index selectively absorbing layer A having a refractive index $n \geq 1.8$
n) a low-index nonabsorbing layer B having a refractive index $n<1.8$
o) a high-index selectively absorbing layer C having a refractive index $n \geq 1.8$ and also p) optionally an outer protective layer D and the multilayer pearlescent pigments have the indices $D_{10}$, $D_{50}$, $D_{90}$ from the cumulative frequency distribution of the volume-averaged size distribution function, with a span $\Delta D$ of 0.8-1.2, the span $\Delta D$ being calculated in accordance with the formula $\Delta D=(D_{90}-D_{10})/D_{50}$.

In a further embodiment, the present invention comprises multilayer pearlescent pigments with a silver interference color, based on platelet-shaped transparent substrates with an optically active coating, wherein the optically active coating comprises at least q) a high-index nonabsorbing layer A having a refractive index $n \geq 1.8$
r) a low-index nonabsorbing layer B having a refractive index $n<1.8$
s) a high-index nonselectively absorbing layer C having a refractive index $n \geq 1.8$, comprising or consisting of, for example, magnetite or ilmenite, and also t) optionally an outer protective layer D and the multilayer pearlescent pigments have the indices $D_{10}$, $D_{50}$, $D_{90}$ from the cumulative frequency distribution of the volume-averaged size distribution function, with a span $\Delta D$ of 0.8-1.2, the span $\Delta D$ being calculated in accordance with the formula $\Delta D=(D_{90}-D_{10})/D_{50}$.

In a further embodiment, the optically active coating A to C of the multilayer pearlescent pigments of the invention comprises the following combinations:

TABLE 4

| Embodiment of the optically active coating | | |
|---|---|---|
| Layer A | Layer B | Layer C |
| $TiO_2$ | $SiO_2$ | $TiO_2$ |
| $TiO_2$ | $SiO_2$ | $Fe_2O_3$ |
| $Fe_2O_3$ | $SiO_2$ | $TiO_2$ |
| $Fe_2O_3$ | $SiO_2$ | $Fe_2O_3$ |

In a further embodiment, the optically active coating of the multilayer pearlescent pigments of the invention consists of combinations stated in table 4.

In a further embodiment, the present invention comprises multilayer pearlescent pigments with a silver interference color, based on platelet-shaped transparent substrates with an optically active coating, wherein the optically active coating comprises at least u) a high-index layer A having a refractive index $n \geq 1.8$ and an optical layer thickness of 50 to 200 nm
v) a low-index layer B having a refractive index $n<1.8$ and an optical layer thickness of 30 to 150 nm
w) a high-index layer C having a refractive index $n \geq 1.8$ and an optical layer thickness of 50 to 200 nm, and also x) optionally an outer protective layer D and the multilayer pearlescent pigments have the indices $D_{10}$, $D_{50}$, $D_{90}$ from the cumulative frequency distribution of the volume-averaged size distribution function, with a span $\Delta D$ of 0.8-1.2, the span $\Delta D$ being calculated in accordance with the formula $\Delta D=(D_{90}-D_{10})/D_{50}$.

In a further embodiment, the present invention comprises multilayer pearlescent pigments with a silver interference color, based on platelet-shaped transparent substrates with an optically active coating, wherein the optically active coating comprises at least y) a high-index layer A having a refractive index $n \geq 1.8$ and an optical layer thickness of 50 to 200 nm
z) a low-index layer B having a refractive index $n<1.8$ and an optical layer thickness of 30 to 150 nm
aa) a high-index layer C having a refractive index $n \geq 1.8$ and an optical layer thickness of 50 to 200 nm, and also bb) optionally an outer protective layer D and the multilayer pearlescent pigments have the indices $D_{10}$, $D_{50}$, $D_{90}$ from the cumulative frequency distribution of the volume-averaged size distribution function, with a span $\Delta D$ of 0.8-1.2, the span $\Delta D$ being calculated in accordance with the formula $\Delta D=(D_{90}-D_{10})/D_{50}$, and the chroma $C^*_{15}$ of the multilayer pearlescent pigments is $\leq 20$, preferably $\leq 17$.

A method for producing the multilayer pearlescent pigments with a silver interference color comprises the following steps:

i) size-classifying the platelet-shaped transparent substrates to be coated
ii) coating the platelet-shaped transparent substrates with above-stated layers A to C and also, optionally, layer D.

If the initial substrates are too large, it is possible, optionally, for a comminuting step to be carried out prior to the size-classifying.

The size-classifying may take place before or after the coating of the substrates. Advantageously, however, the substrate is first classified and then coated. Size-classifying is carried out, and optionally repeated, until the multilayer pearlescent pigments have the size distribution according to the invention.

A narrow span ΔD for the substrates may be achieved by suitable comminuting and/or classifying operations on the platelet-shaped transparent substrates to be coated. The platelet-shaped transparent substrates to be coated may be comminuted, for example, by ball mill, jet or agitator ball mill, edge-runner mill or dissolver. The span ΔD of the final fraction can be adjusted by appropriate classifying, such as a multiple wet screening, for example. Other classifying methods include centrifugation in cyclones or sedimentation from a dispersion.

The comminuting and classifying operations may take place in succession and optionally may be combined with one another. Hence a comminuting operation may be followed by a classifying operation, which is followed by a further comminuting operation on the fine fraction, and so on.

The metal oxide layers are preferably applied wet-chemically, in which case the wet-chemical coating methods developed for the production of pearlescent pigments may be employed. In the case of wet coating, the substrate particles are suspended in water and are admixed with one or more hydrolyzable metal salts or with a waterglass solution at a pH which is suitable for hydrolysis and which is selected such that the metal oxides and/or metal oxide hydrates are precipitated directly on the substrate to be coated, without any instances of secondary precipitation. The pH is typically held constant by simultaneous metered addition of a base and/or acid. The pigments are subsequently separated off, washed, dried at 50-150° C. for 6-18 hours, and optionally calcined for 0.5-3 hours, it being possible for the calcining temperature to be optimized in terms of the particular coating present. Generally speaking, the calcining temperatures are between 500 and 1000° C., preferably between 600 and 900° C. If desired, the pigments, following application of individual coatings, may be separated off, dried, and optionally calcined, before then being resuspended for the precipitation of the further layers.

The precipitation of the $SiO_2$ layer onto the platelet-shaped transparent substrate to be coated may be accomplished by addition of a potassium or sodium waterglass solution at a suitable pH. The $SiO_2$ layer may alternatively be applied via sol-gel methods, starting from alkoxysilanes, such as tetraethoxysilane, for example.

The multilayer pearlescent pigments of the invention can also be used advantageously in blends with transparent and hiding white, chromatic, and black pigments, and also with other effect pigments.

The multilayer pearlescent pigments of the invention can be used for producing pigment preparations and dry products.

Furthermore, the multilayer pearlescent pigments of the invention can be used, for example, in cosmetics formulations, plastics, ceramic materials, glasses, and coating compositions such as paints, printing inks, as for example for offset, screen, gravure, flexographic or security printing or for bronze printing, liquid inks, in toners, coating materials, e.g., auto finishes or powder coating materials, for the laser marking of paper and plastics, for seed coloring, for coloring foods or pharmaceutical products, or for coloring (agricultural) films, tarpaulins or textiles.

In cosmetics formulations, the multilayer pearlescent pigments of the invention with a silver interference color can be combined with raw materials, auxiliaries, and actives that are suitable for the particular application. The concentration of the multilayer pearlescent pigments in the formulation may lie between 0.001% by weight for rinse-off products and 40.0% by weight for leave-on products.

The multilayer pearlescent pigments of the invention are suitable more particularly for use in cosmetics, such as, for example, body powders, face powders, pressed and loose powder, face makeup, powder cream, cream makeup, emulsion makeup, wax makeup, foundation, mousse makeup, rouge, eye makeup such as eyeshadow, mascara, eyeliners, liquid eyeliners, eyebrow pencil, lipcare stick, lipstick, lip gloss, lip liner, hairstyling compositions such as hairspray, hair mousse, hair gel, hair wax, hair mascara, permanent or semipermanent hair colors, temporary hair colors, skincare compositions such as lotions, gels, and emulsions, and also nail varnish compositions.

In order to obtain specific color effects it is possible, in the cosmetics applications, to use not only the multilayer pearlescent pigments of the invention but also further colorants and/or conventional effect pigments or mixtures thereof in variable proportions. Conventional effect pigments used may be, for example, commercial pearlescent pigments based on natural mica coated with high-index metal oxides (such as, for example, the Prestige product group from Eckart), BiOCl platelets, $TiO_2$ platelets, pearlescent pigments based on synthetic mica coated with high-index metal oxides or based on glass platelets coated with high-index metal oxides (such as, for example, the MIRAGE product group from Eckart), $Al_2O_3$, $SiO_2$ or $TiO_2$ platelets. Moreover, it is also possible for metallic effect pigments to be added, such as the Visionaire product group from Eckart, for example. The colorants may be selected from inorganic or organic pigments.

EXAMPLES

The invention is elucidated in more detail below through a number of examples, without being confined to these examples.

I Prepration of The Pigments
A Classification of the Substrates

Inventive Example 1

Classification of Glass Flakes with Narrow Span ΔD=1.0

A suspension of 200 g of glass flakes (GF100M from Glassflake Ltd) in FD water (FD=fully demineralized, approximately 3% by weight content) was classified on a 100 μm sieve, and the sieve undersize was sieved again on a 63 μm sieve. This sieving procedure was repeated twice with sieve residue obtained on the 63 μm sieve. This gave a glass flake fraction having the following particle size distribution (Malvern Mastersizer 2000): $D_{10}$=50 μm, $D_{50}$=82 μm, $D_{90}$=132 μm, span ΔD=1.0.

Inventive Example 2

Classification of Glass Flakes with Narrow Span ΔD=1.1

A suspension of 200 g of glass flakes (GF 100M from Glassflake Ltd) in FD water (approximately 3% by weight content) was classified on a 63 μm sieve, and the sieve undersize was sieved again on a 34 μm sieve. This sieving procedure was repeated twice with sieve residue obtained on the 34 μm sieve. This gave a glass flake fraction having the following particle size distribution (Malvern Mastersizer 2000): $D_{10}=32$ μm, $D_{50}=60$ μm, $D_{90}=100$ μm, span $\Delta D=1.1$.

Comparative Example 1

Classification of Glass Flakes with Broad Span $\Delta D=2.0$

A suspension of 200 g of glass flakes (GF 100M from Glassflake Ltd) in FD water (approximately 3% by weight content) was classified on a 150 μm sieve, and the sieve undersize was sieved again on a 34 μm sieve. This sieving procedure was repeated twice with sieve residue obtained on the 34 μm sieve. This gave a glass flake fraction having the following particle size distribution (Malvern Mastersizer 2000): $D_{10}=25$ μm, $D_{50}=88$ μm, $D_{90}=200$ μm, span $\Delta D=2.0$.

Inventive Example 3

Classification of Natural Mica with Narrow Span $\Delta D=1.2$ 1 kg of muscovite mica MD 2800 from Minelco Specialities Ltd. England was calcined at 700° C. for 1 h, then admixed with 1000 ml of FD water, and subsequently delaminated for approximately 1.5 h in a laboratory edge-runner mill from American Cyanamid Company. The cake was subsequently brought with FD water to a solids content of 35% by weight and sieved on a Sweco Separator laboratory sieve to <250 μm.

The fine mica fraction thus obtained was then treated in a Pendraulik TD 200 laboratory dissolver for 5 h. During this treatment, care was taken to ensure, by cooling, that the temperature of the suspension did not exceed 80° C.

The mica suspension was then diluted with FD water to a solids content of 3% by weight and sieved on a Sweco Separator laboratory sieve to <34 μm. The sieve undersize was then sedimented off using a sedimentation vessel for 5 h. The supernatant was drawn off under suction, and the sediment was taken up again with water, stirred vigorously, and sedimented off again for 5 h. This operation was repeated a total of 4 times, until there was virtually no longer any visible supernatant.

The sedimentation vessel possessed a cylindrical shape with the following dimensions: d=50 cm; h=50 cm.

The sediment was filtered with suction on a Buchner funnel, and the filtercake obtained was used as starting material for further coatings.

This gave a mica fraction which had the following particle size distribution (Malvern Mastersizer 2000): $D_{10}=12.4$ μm, $D_{50}=25.6$ μm, $D_{90}=43.2$ μm, span $\Delta D=1.2$.

Inventive Example 4

Classification of Synthetic Mica with Narrow Span $\Delta D=1.2$

A suspension of 200 g of artificial mica Sanbao 10-40 (Shantou F. T. Z. Sanbao Pearl Luster Mica Tech Co., Ltd. China) in FD water (about 3% by weight content) was classified on a 34 μm sieve, and the sieve undersize was again sieved on a 20 μm sieve. This sieving procedure was repeated twice with sieve residue obtained on the 20 μm sieve. This gave a mica fraction which had the following particle size distribution (Malvern Mastersizer 2000): $D_{10}=14$ μm, $D_{50}=26$ μm, $D_{90}=45$ μm, span $\Delta D=1.2$.

Comparative Example 2

Classification of Natural Mica with Broad Span $\Delta D=3.7$ 1 kg of muscovite mica MD 2800 from Minelco Specialities Ltd. England was calcined at 700° C. for 1 h, then admixed with 1000 ml of FD water, and subsequently delaminated for approximately 1 h in a laboratory edge-runner mill from American Cyanamid Company.

The cake was subsequently diluted with FD water to a solids content of 30% by weight and treated in a Pendraulik TD 200 laboratory dissolver for 1 h. In the course of this treatment, care was taken to ensure that, by cooling, the temperature of the suspension did not exceed 80° C.

The suspension was subsequently brought with FD water to a solids content of 2% by weight and was sieved on a Sweco Separator laboratory sieve to <250 μm.

The resulting mica fraction was then filtered off under suction on a Buchner funnel, and the filtercake obtained was used as starting material for further coatings.

This gave a mica fraction having the following particle size distribution (Malvern Mastersizer 2000): $D_{10}=19.2$ μm, $D_{50}=81.7$ μm, $D_{90}=280.9$ μm, span $\Delta D=3.2$.

Comparative Example 3

Classification of Synthetic Mica with Broad Span $\Delta D=3.7$ 1 kg of commercial unclassified synthetic/artificial mica Sanbao (from Shantou F. T. Z. Sanbao Pearl Luster Mica Tech Co., Ltd. China) was admixed with 1000 ml of FD water, and subsequently delaminated for approximately 1 h in a laboratory edge-runner mill from American Cyanamid Company.

The cake was subsequently diluted with FD water to a solids content of 25% by weight and treated in a Pendraulik TD 200 laboratory dissolver for 1 h. In the course of this treatment, care was taken to ensure that, by cooling, the temperature of the suspension did not exceed 80° C.

The suspension was subsequently brought with FD water to a solids content of 3% by weight and was sieved on a Sweco Separator laboratory sieve to <250 μm.

The resulting mica fraction was then filtered off under suction on a Buchner funnel, and the filtercake obtained was used as starting material for further coatings.

This gave a mica fraction having the following particle size distribution (Malvern Mastersizer 2000): $D_{10}=17.7$ μm, $D_{50}=74.6$ μm, $D_{90}=292.3$ μm, span $\Delta D=3.7$.

B Preparation of Single-Layer Pigments (Starting Material for Multilayer Pearlescent Pigments)

Compartive Example 4

Preparation of the Starting Material for Inventive Example 5

200 g of glass flakes from inventive example 1 were suspended in 2000 ml of FD water and heated to 80° C. with turbulent stirring. The pH of the suspension was adjusted to 1.9 using dilute HCl, and then a first layer of "$SnO_2$" was precipitated onto the glass flakes. This layer was formed by addition of a solution consisting of 3 g of $SnCl_4 \times 5\ H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 75 ml of TiCl$_4$ (200 g TiO$_2$/l FD water) was metered into the suspension. During the addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 650° C. for 30 min. This gave a lustrous effect pigment with a silver interference color.

Comparative Example 5

Preparation of the Starting Material for Inventive Example 6

200 g of glass flakes from inventive example 2 were suspended in 2000 ml of FD water and heated to 80° C. with turbulent stirring. The pH of the suspension was adjusted to 1.9 using dilute HCl, and then a first layer of "SnO$_2$" was precipitated onto the glass flakes. This layer was formed by addition of a solution consisting of 3 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 77 ml of TiCl$_4$ (200 g TiO$_2$/l FD water) was metered into the suspension. During the addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 650° C. for 30 min. This gave a lustrous effect pigment with a silver interference color.

Comparative Example 6

Preparation of the Starting Material for Inventive Examples 7 and 8

200 g of glass flakes from inventive example 1 were suspended in 2000 ml of FD water and heated to 80° C. with turbulent stirring. The pH of the suspension was adjusted to 1.9 using dilute HCl, and then a first layer of "SnO$_2$" was precipitated onto the glass platelets. This layer was formed by addition of a solution consisting of 3 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was raised to 3.0 using dilute HCl, and then a solution of 42 ml of FeCl$_3$ (280 g Fe$_2$O$_3$/l FD water) was metered into the suspension. During the addition, the pH was kept constant at 3.0 by counter-control with 10% strength by weight NaOH solution. This was followed by stirring for 15 min more, by filtration, and by washing of the filtercake with FD water. The filtercake was dried initially at 100° C. and calcined at 650° C. for 30 min. This gave a lustrous effect pigment with a silver interference color and a slightly orange-red absorption color.

Comparative Example 7

Preparation of the Starting Material for Comparative Example 9

200 g of glass flakes from comparative example 1 were suspended in 2000 ml of FD water and heated to 80° C. with turbulent stirring. The pH of the suspension was adjusted to 1.9 using dilute HCl, and then a first layer of "SnO$_2$" was precipitated onto the glass flakes. This layer was formed by addition of a solution consisting of 3 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 75 ml of TiCl$_4$ (200 g TiO$_2$/l FD water) was metered into the suspension. During the addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 650° C. for 30 min. This gave a lustrous effect pigment with a silver interference color.

Comparative Example 8

Natural Mica/TiO$_2$ (Rutile)

200 g of natural mica from inventive example 3 were suspended in 2000 ml of FD water and heated to 80° C. with turbulent stirring. The pH of the suspension was adjusted to 1.9 using dilute HCl, and then a first layer of "SnO$_2$" was precipitated onto the mica. This layer was formed by addition of a solution consisting of 5 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 250 ml of TiCl$_4$ (200 g TiO$_2$/l FD water) was metered into the suspension. During the addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 750° C. for 30 min. This gave a lustrous effect pigment with a silver interference color.
C Preparation of the Multilayer Pearlescent Pigments Inventive Eample 5

Glass Flakes/TiO$_2$ (rutile)/SiO$_2$/TiO$_2$ (Rutile)

200 g of glass flakes from comparative example 4 were suspended in 1300 ml of FD water and heated to 80° C. with turbulent stirring. The pH was raised to 7.5 using 5% strength by weight NaOH solution, followed by stirring for 15 min. A waterglass solution (52 g of waterglass solution, 27% by weight SiO$_2$, mixed with 52 g of FD water) was then introduced slowly into the suspension and the pH was kept constant at 7.5. This was followed by stirring for a further 20 min, and the pH was lowered to 1.9. Then a layer of "SnO$_2$" was deposited on the SiO$_2$ surface. This layer was formed by addition of a solution consisting of 3 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 60 ml of TiCl$_4$ (200 g TiO$_2$/l FD water) was metered into the suspension. During the addition, the pH was kept constant at 1.6 by counter-control with 10% strength by weight NaOH solution. During the metered addition, individual samples were taken after addition of 15 ml of $TiCl_4$ solution (sample 1), 30 ml of $TiCl_4$ solution (sample 2), and 45 ml of $TiCl_4$ solution (sample 3). This was followed by stirring for a further 15 minutes, by filtration, and by washing of the filtercake with FD water. The filtercake and the samples were initially dried at 100° C. and calcined at 650° C. for 30 min. This gave extremely highly lustrous multilayer pearlescent pigments with a silver interference color.

Comparative Example 9

Glass Flakes/$TiO_2$ (Rutile)/$SiO_2$/$TiO_2$ (Rutile)

200 g of $TiO_2$-coated glass flakes from comparative example 7 were suspended in 1300 ml of FD water and heated to 80° C. with turbulent stirring. The pH was raised to 7.5 using 5% strength by weight NaOH solution, followed by stirring for 15 min. A waterglass solution (52 g of waterglass solution, 27% by weight $SiO_2$, mixed with 52 g of FD water) was then introduced slowly into the suspension and the pH was kept constant at 7.5. This was followed by stirring for a further 20 min, and the pH was lowered to 1.9. Then a layer of "$SnO_2$" was deposited on the $SiO_2$ surface. This layer was formed by addition of a solution consisting of 3 g of $SnCl_4 \times 5$ $H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 60 ml of $TiCl_4$ (200 g $TiO_2$/l FD water) was metered into the suspension. During the addition, the pH was kept constant at 1.6 by counter-control with 10% strength by weight NaOH solution. During the metered addition, individual samples were taken after addition of 15 ml of $TiCl_4$ solution (sample 1), 30 ml of $TiCl_4$ solution (sample 2), and 45 ml of $TiCl_4$ solution (sample 3). This was followed by stirring for a further 15 minutes, by filtration, and by washing of the filtercake with FD water. The filtercake and the samples were initially dried at 100° C. and calcined at 650° C. for 30 min. This gave multilayer pearlescent pigments with a silver interference color.

Inventive Example 6

Glass Flakes/$TiO_2$ (Rutile)/$SiO_2$/$Fe_2O_3$ 200 g of $TiO_2$-coated glass flakes from comparative example 5 were suspended in 1300 ml of FD water and heated to 80° C. with turbulent stirring. The pH was raised to 7.5 using 5% strength by weight NaOH solution, followed by stirring for 15 min. A waterglass solution (52 g of waterglass solution, 27% by weight $SiO_2$, mixed with 52 g of FD water) was then introduced slowly into the suspension and the pH was kept constant at 7.5. This was followed by stirring for a further 20 min, the pH was lowered to 3.0, and then a solution of 40 ml of $FeCl_3$ (280 g $Fe_2O_3$/l FD water) was metered into the suspension. During the addition, the pH was kept constant at 3.0 by counter-control with 10% strength by weight NaOH solution. During the metered addition, individual samples were taken after addition of 20 ml of $FeCl_3$ solution (sample 1) and 30 ml of $FeCl_3$ solution (sample 2). This was followed by stirring for a further 15 minutes, by filtration, and by washing of the filtercake with FD water. The filtercake and the samples were initially dried at 100° C. and calcined at 650° C. for 30 min. This gave extremely highly lustrous multilayer pearlescent pigments with a silver interference color and a slightly orange-reddish absorption color.

Inventive Example 7

Glass Flakes/$Fe_2O_3$/$SiO_2$/$Fe_2O_3$ 200 g of glass flakes from comparative example 6 were suspended in 1400 ml of isopropanol and heated to 70° C. with turbulent stirring. This suspension was admixed with 55 g of tetraethoxysilane, 55 g of FD water, and 5 ml of 10% strength by weight $NH_3$ solution. The reaction mixture was stirred for approximately 12 h, after which it was filtered, and the filtercake was washed with isopropanol and dried in a vacuum drying cabinet at 100° C.

100 g of the resulting $SiO_2$-coated glass flakes were suspended in 700 ml of FD water and heated to 80° C. with turbulent stirring. The pH of the suspension was adjusted to 1.9 using dilute HCl, and then a first layer of "$SnO_2$" was precipitated onto the coated glass flakes. This layer was formed by addition of a solution consisting of 1.5 g of $SnCl_4 \times 5$ $H_2O$ (in 5 ml of conc. HCl+25 ml of FD water), with simultaneous metered addition of a 10% strength by weight NaOH solution in order to keep the pH constant, over a period of 1 h. In order to complete the precipitation, the suspension was stirred for 15 min more. Thereafter the pH was raised to 3.0 using dilute HCl, and then a solution of 17.5 ml of $FeCl_3$ (280 g $Fe_2O_3$/l FD water) was metered into the suspension. During this addition, the pH was kept constant at 3.0 by counter-control with 10% strength by weight NaOH solution. During the metered addition, individual samples were taken after addition of 3.75 ml of $FeCl_3$ solution (sample 1), 7.5 ml of $FeCl_3$ solution (sample 2), 10 ml of $FeCl_3$ solution (sample 3), 12.5 ml of $FeCl_3$ solution (sample 4), and 15.5 ml of $FeCl_3$ solution (sample 5). This was followed by stirring for min more, by filtration, and by washing of the filtercake with FD water. The filtercake and the samples were initially dried at 100° C. and calcined at 650° C. for 30 min. This gave extremely highly lustrous multilayer pearlescent pigments having a silver interference color and a slightly orange-red absorption color.

Inventive Example 8

Glass Flakes/$Fe_2O_3$/$SiO_2$/$TiO_2$ (Rutile)

200 g of glass flakes from comparative example 6 were suspended in 1400 ml of isopropanol and heated to 70° C. with turbulent stirring. This suspension was admixed with 55 g of tetraethoxysilane, 55 g of FD water, and 5 ml of 10% strength by weight $NH_3$ solution. The reaction mixture was stirred for approximately 12 h, after which it was filtered, and the filtercake was washed with isopropanol and dried in a vacuum drying cabinet at 100° C.

100 g of the resulting $SiO_2$-coated glass flakes were suspended in 700 ml of FD water and heated to 80° C. with turbulent stirring. The pH of the suspension was adjusted to 1.9 using dilute HCl, and then a first layer of "$SnO_2$" was precipitated onto the coated glass flakes. This layer was formed by addition of a solution consisting of 1.5 g of $SnCl_4 \times 5$ $H_2O$ (in 5 ml of conc. HCl+25 ml of FD water), with simultaneous metered addition of a 10% strength by weight NaOH solution in order to keep the pH constant, over a period of 1 h. In order to complete the precipitation, the suspension was stirred for 15 min more. Thereafter the pH was lowered to 1.6 using dilute HCl, and then a solution of 35 ml of $TiCl_4$ (200 g $TiO_2$/l FD water) was metered into the suspension.

During this addition, the pH was kept constant at 1.6 by counter-control with 10% strength by weight NaOH solution. During the metered addition, individual samples were taken after addition of 7.5 ml of TiCl$_4$ solution (sample 1), 10 ml of TiCl$_4$ solution (sample 2), 12.5 ml of TiCl$_4$ solution (sample 3), 15 ml of TiCl$_4$ solution (sample 4), and 25 ml of TiCl$_4$ solution (sample 5). This was followed by stirring for min more, by filtration, and by washing of the filtercake with FD water. The filtercake and the samples were initially dried at 100° C. and calcined at 650° C. for 30 min. This gave extremely highly lustrous silver-colored multilayer pearlescent pigments having a slightly orange-red masstone.

Comparative Example 10

Natural Mica/TiO$_2$ (Rutile)/SiO$_2$/TiO$_2$ (Rutile)

200 g of natural mica from comparative example 2 were suspended in 2000 ml of FD water and heated to 80° C. with turbulent stirring. The pH of the suspension was adjusted to 1.9 using dilute HCl, and then a first layer of "SnO$_2$" was precipitated onto the mica. This layer was formed by addition of a solution consisting of 5 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 320 ml of TiCl$_4$ (200 g TiO$_2$/l FD water) was metered into the suspension. During the addition, the pH was kept constant at 1.6 by counter-control with 10% strength by weight NaOH solution. Thereafter the pH was raised to 7.5 using 5% strength by weight NaOH solution, and stirring was carried out for 15 min. A waterglass solution (200 g of waterglass solution, 24% by weight SiO$_2$, mixed with 207 g of FD water) was then introduced slowly into the suspension and the pH was kept constant at 7.5. This was followed by further stirring for 20 min, and the pH was lowered to 1.9 again. Then a second layer of "SnO$_2$" was deposited on the SiO$_2$ surface. This layer was formed by addition of a solution consisting of 5 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 60 ml of TiCl$_4$ (200 g TiO$_2$/l FD water) was metered into the suspension. During this addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 750° C. for 30 min. This gave a weakly lustrous multilayer pearlescent pigment with a silver interference color.

Comparative Example 11

Synthetic Mica/Fe$_2$O$_3$/SiO$_2$/TiO$_2$ (Rutile)

200 g of synthetic mica from comparative example 3 were suspended in 2000 ml of FD water and heated to 80° C. with turbulent stirring. The pH of the suspension was adjusted to 3.0 using dilute HCl, and then a solution of 37.5 ml of FeCl$_3$ (280 g Fe$_2$O$_3$/l FD water) was metered into the suspension. During this addition, the pH was kept constant at 3.0 by counter-control with 10% strength by weight NaOH solution. In order to complete the precipitation, the suspension was stirred for a further 15 min. Thereafter the pH was raised to 7.5 using 5% strength by weight NaOH solution, followed by stirring for 15 min. A waterglass solution (153 g of waterglass solution, 20% by weight SiO$_2$, mixed with 207 g of FD water) was then introduced slowly into the suspension and the pH was kept constant at 7.5. This was followed by stirring for 20 min more, and the pH was lowered again to 1.9. Then a layer of "SnO$_2$" was deposited on the SiO$_2$ surface. This layer was formed by addition of a solution consisting of 5 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further min. Thereafter the pH was lowered to 1.6 using dilute HCl, and then a solution of 150 ml of TiCl$_4$ (200 g TiO$_2$/l FD water) was metered into the suspension. During this addition, the pH was kept constant at 1.6 by counter-control with 10% strength by weight NaOH solution. This was followed by a further 15 min of stirring, by filtration, and by washing of the filtercake with FD water. The filtercake was initially dried at 100° C. and calcined at 750° C. for 30 min. This gave a weakly lustrous multilayer pearlescent pigment with a silver interference color and a reddish brown absorption color.

Inventive Example 9

Natural Mica/TiO$_2$ (Rutile)/SiO$_2$/TiO$_2$ (Rutile)

200 g of natural mica from inventive example 3 were suspended in 2000 ml of FD water and heated to 80° C. with turbulent stirring. The pH of the suspension was adjusted to 1.9 using dilute HCl, and then a first layer of "SnO$_2$" was precipitated onto the mica. This layer was formed by addition of a solution consisting of 6 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 320 ml of TiCl$_4$ (200 g TiO$_2$/l FD water) was metered into the suspension. During the addition, the pH was kept constant at 1.6 by counter-control with 10% strength by weight NaOH solution. Thereafter the pH was raised to 7.5 using 5% strength by weight NaOH solution, and stirring was carried out for 15 min. A waterglass solution (200 g of waterglass solution, 24% by weight SiO$_2$, mixed with 207 g of FD water) was then introduced slowly into the suspension and the pH was kept constant at 7.5. This was followed by further stirring for 20 min, and the pH was lowered to 1.9 again. Then a second layer of "SnO$_2$" was deposited on the SiO$_2$ surface. This layer was formed by addition of a solution consisting of 6 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 320 ml of TiCl$_4$ (200 g TiO$_2$/l FD water) was metered into the suspension. During this addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 750° C. for 30 min.

This gave an extremely highly lustrous multilayer pearlescent pigment with a silver interference color.

Inventive Example 10

Synthetic Mica/$Fe_2O_3$/$SiO_2$/$TiO_2$ (Rutile)

200 g of synthetic mica from inventive example 4 were suspended in 2000 ml of FD water and heated to 80° C. with turbulent stirring. The pH of the suspension was adjusted to 3.0 using dilute HCl, and then a solution of 60 ml of $FeCl_3$ (280 g $Fe_2O_3$/l FD water) was metered into the suspension. During this addition, the pH was kept constant at 3.0 by counter-control with 10% strength by weight NaOH solution. In order to complete the precipitation, the suspension was stirred for a further 15 min. Thereafter the pH was raised to 7.5 using 5% strength by weight NaOH solution, followed by stirring for 15 min. A waterglass solution (185 g of waterglass solution, 24% by weight $SiO_2$, mixed with 207 g of FD water) was then introduced slowly into the suspension and the pH was kept constant at 7.5. This was followed by stirring for 20 min more, and the pH was lowered again to 1.9. Then a layer of "$SnO_2$" was deposited on the $SiO_2$ surface. This layer was formed by addition of a solution consisting of 5 g of $SnCl_4 \times 5$ $H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further min. Thereafter the pH was lowered to 1.6 using dilute HCl, and then a solution of 200 ml of $TiCl_4$ (200 g $TiO_2$/l FD water) was metered into the suspension. During this addition, the pH was kept constant at 1.6 by counter-control with 10% strength by weight NaOH solution. This was followed by a further 15 min of stirring, by filtration, and by washing of the filtercake with FD water. The filtercake was initially dried at 100° C. and calcined at 750° C. for 30 min. This gave an extremely highly lustrous multilayer pearlescent pigment with a silver interference color and a reddish brown absorption color.

II Physical Characterization

IIa Angle-Dependent Color Measurements

For the measurement of the chroma values, the multilayer pearlescent pigments were incorporated by stirring, with a level of pigmentation of 6% by weight (based on the total weight of the wet varnish), into a conventional nitrocellulose varnish (Dr. Renger Erco Bronzemischlack 2615e; from Morton). The multilayer pearlescent pigments were introduced first and then dispersed into the varnish using a brush.

The completed varnish was applied on a drawdown apparatus (RK Print Coat Instr. Ltd. Citenco K 101), with a wet film thickness, depending on $D_{50}$ value of the multilayer pearlescent pigment, in accordance with table 3, onto Byk-Gardner black/white drawdown charts (Byko-Chart 2853), and subsequently dried at room temperature.

Using the multi-angle colorimeter BYK-MAC (from BYK Gardner), with a constant incident angle of 45° (in accordance with manufacturer specifications), the L* and C* values were determined at different angles of observation relative to the specular angle. Particularly relevant were the observation angles relatively close to the specular angle, at 15° and −15°. The relevant chroma value of the multilayer pearlescent pigments of the invention was taken to be the $C^*_{15}$ value, which was measured at an angle removed by 15° from the specular.

Strongly reflecting samples (ideal mirror case) reflected virtually the entire incident light at the so-called specular angle. Here, the color of the interference color appeared most strongly. The further from the specular angle in the course of measurement, the less light and hence interference effect it was possible to measure.

IIb Gloss Measurements

The gloss is a measure of the directed reflection and can be characterized using a Micro-Tri-Gloss instrument. More strongly scattering samples therefore exhibit a low gloss.

The nitro varnish applications from IIa were subjected to measurement using a Micro-Tri-Gloss gloss meter from Byk Gardner at a measurement angle of 20° for high-gloss samples and at 60° for medium-gloss samples, on a black background. Where the gloss values at 60° were above 70 gloss units, the samples are measured at 20° (Byk-Gardner catalogue 2007/2008, p. 14).

IIc Particle Size Determination:

The size distribution curve was determined using an instrument from Malvern (instrument: Malvern Mastersizer 2000) in accordance with manufacturer indications. For this purpose, about 0.1 g of the pigment in question was placed in the form of an aqueous suspension, without addition of dispersing assistants, and with continual stirring with a Pasteur pipette, into the sample preparation cell of the measuring instrument, and subjected to repeated measurement. From the individual measurement results, the resultant averages were formed. The scattered light signals in this case were evaluated in accordance with the theory of Mie, which also includes refraction and absorption behavior of the particles (FIG. 3).

The average size $D_{50}$ refers in the context of this invention to the $D_{50}$ value of the cumulative undersize curve of the volume-averaged size distribution function, as obtained by laser diffraction methods. The $D_{50}$ value indicates that 50% of the pigments have a diameter which is the same as or smaller than the stated value, for example 20 μm.

Accordingly, the $D_{90}$ value indicates that 90% of the pigments have a diameter which is the same as or smaller than the value in question.

Additionally, the $D_{10}$ value indicates that 10% of the pigments have a diameter which is the same as or smaller than the value in question.

The span $\Delta D$, defined as $\Delta D = (D_{90} - D_{10})/D_{50}$, gives the breadth of the distribution.

III RESULTS

TABLE 5

Characterization of the effect pigments

| Effect pigment | Interim sample | Construction | Gloss, 20° | $C^*_{15}$ | Span |
|---|---|---|---|---|---|
| Comparative example 4 | | Glass/$TiO_2$ | 78.0 | 6.0 | 1.1 |
| Comparative example 7 | | Glass/$TiO_2$ | 67.8 | 6.4 | 2.0 |
| Inventive example 5 | 1 | Glass/$TiO_2$/ $SiO_2$/$TiO_2$ | 70.6 | 12.8 | 1.1 |
| Inventive example 5 | 2 | Glass/$TiO_2$/ $SiO_2$/$TiO_2$ | 86.8 | 15.7 | 1.1 |
| Inventive example 5 | 3 | Glass/$TiO_2$/ $SiO_2$/$TiO_2$ | 94.1 | 16.9 | 1.1 |
| Inventive example 5 | End product | Glass/$TiO_2$/ $SiO_2$/$TiO_2$ | 109.6 | 13.3 | 1.1 |
| Comparative example 9 | 1 | Glass/$TiO_2$/ $SiO_2$/$TiO_2$ | 60.7 | 11.4 | 2.0 |
| Comparative example 9 | 2 | Glass/$TiO_2$/ $SiO_2$/$TiO_2$ | 71.4 | 13.4 | 2.0 |
| Comparative example 9 | 3 | Glass/$TiO_2$/ $SiO_2$/$TiO_2$ | 74.3 | 12.5 | 2.0 |
| Comparative example 9 | End product | Glass/$TiO_2$/ $SiO_2$/$TiO_2$ | 77.8 | 14.2 | 2.0 |

Figure 4:
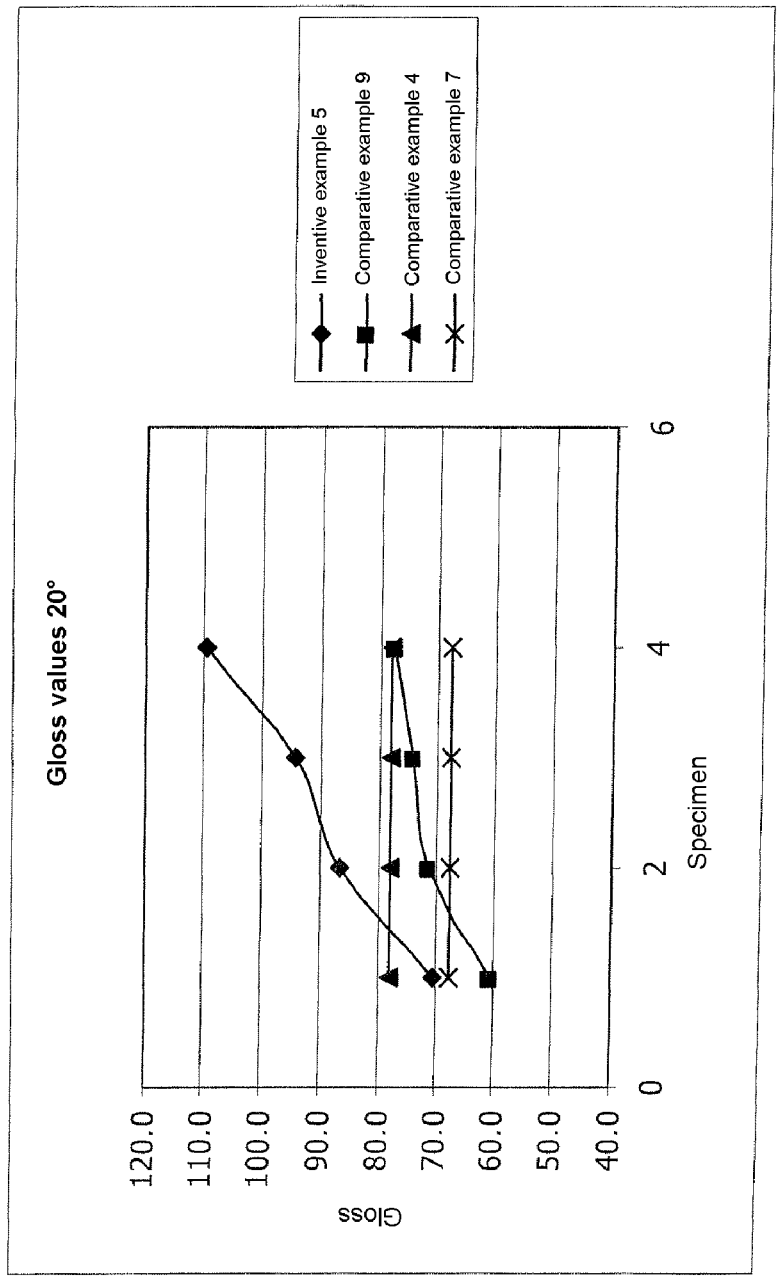
FIG. 4 shows the gloss values measured at a measurement angle of 20° with pigments obtained in the indicated examples.

From the data in table 5 it can clearly be seen that the inventive example 5, with the layer construction glass flake/$TiO_2$/$SiO_2$/$TiO_2$ and a low span $\Delta D = 1.1$, exhibited a strong gloss gain with increasing titanium dioxide layer thickness. The gloss gain in comparison with the starting material, comparative example 4, was 31.6 units here. For comparative example 9 as well, with a large span $\Delta D = 2.0$, increased gloss values were found, but the increase was only 10 gloss units (FIG. 4). An increase in the $TiO_2$ layer thickness in comparative examples 4 and 7 would lead to colored, nonsilver interference effects.

Figure 5:
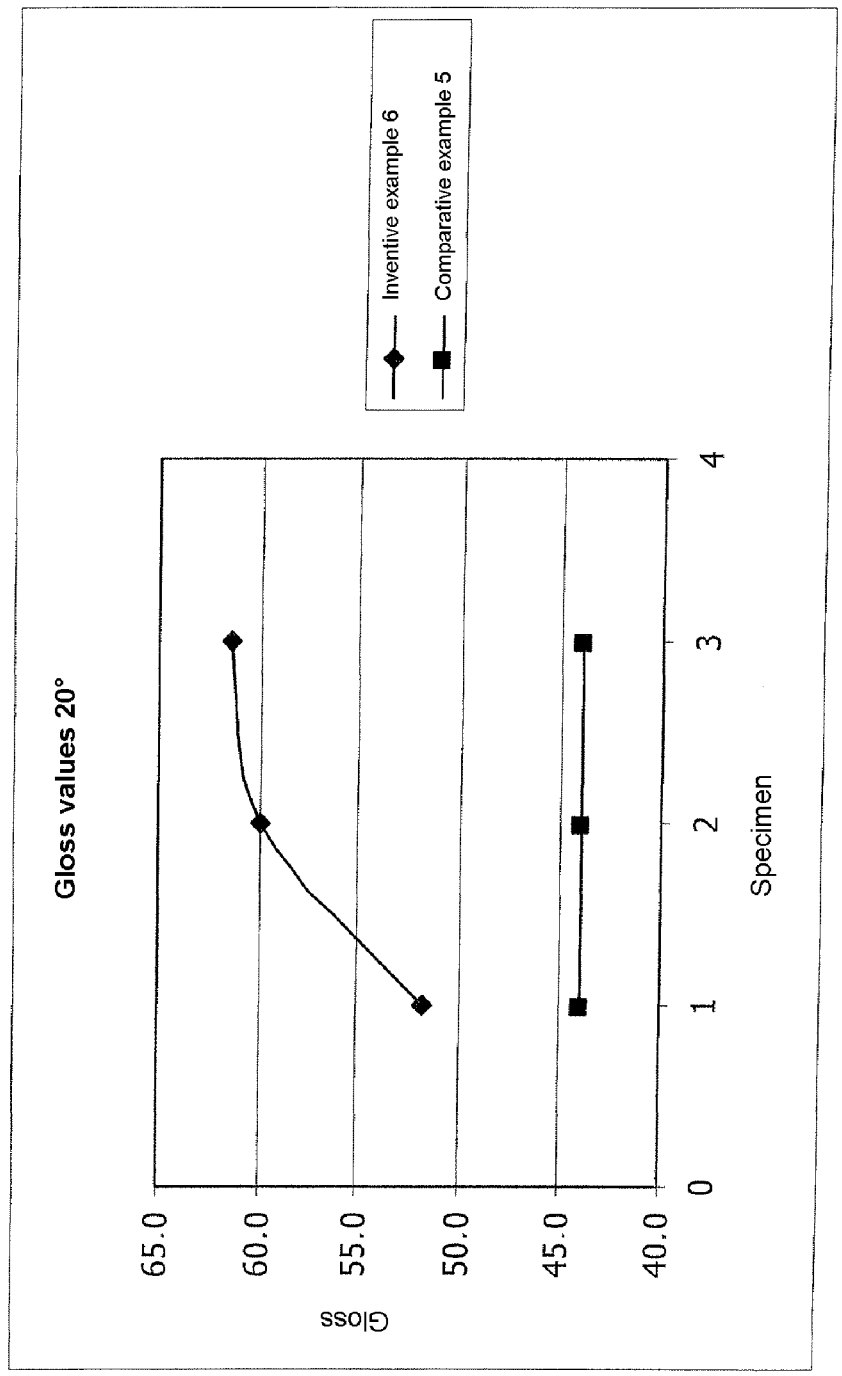
FIG. 5 shows the gloss values measured at a measurement angle of 20° with pigments obtained in the indicated examples.

Similar effects were also found for the inventive example 6 (table 6), which possesses a glass flake/$TiO_2$/$SiO_2$/$Fe_2O_3$ layer construction, the gloss value here being increased by 17.4 units (FIG. 5).

An increase in the $TiO_2$ layer thickness in the comparative example 5 would lead to colored, nonsilver interference effects.

TABLE 6

Characterization of the effect pigments

| Effect pigment | Interim sample | Construction | Gloss, 20° | $C^*_{15}$ | Span |
|---|---|---|---|---|---|
| Comparative example 5 | | Glass/$TiO_2$ | 44.0 | 5.7 | 1.1 |
| Inventive example 6 | 1 | Glass/$TiO_2$/$SiO_2$/$Fe_2O_3$ | 51.7 | 5.9 | 1.1 |
| Inventive example 6 | 2 | Glass/$TiO_2$/$SiO_2$/$Fe_2O_3$ | 59.9 | 3.9 | 1.1 |
| Inventive example 6 | End product | Glass/$TiO_2$/$SiO_2$/$Fe_2O_3$ | 61.4 | 4.9 | 1.1 |

Figure 6:
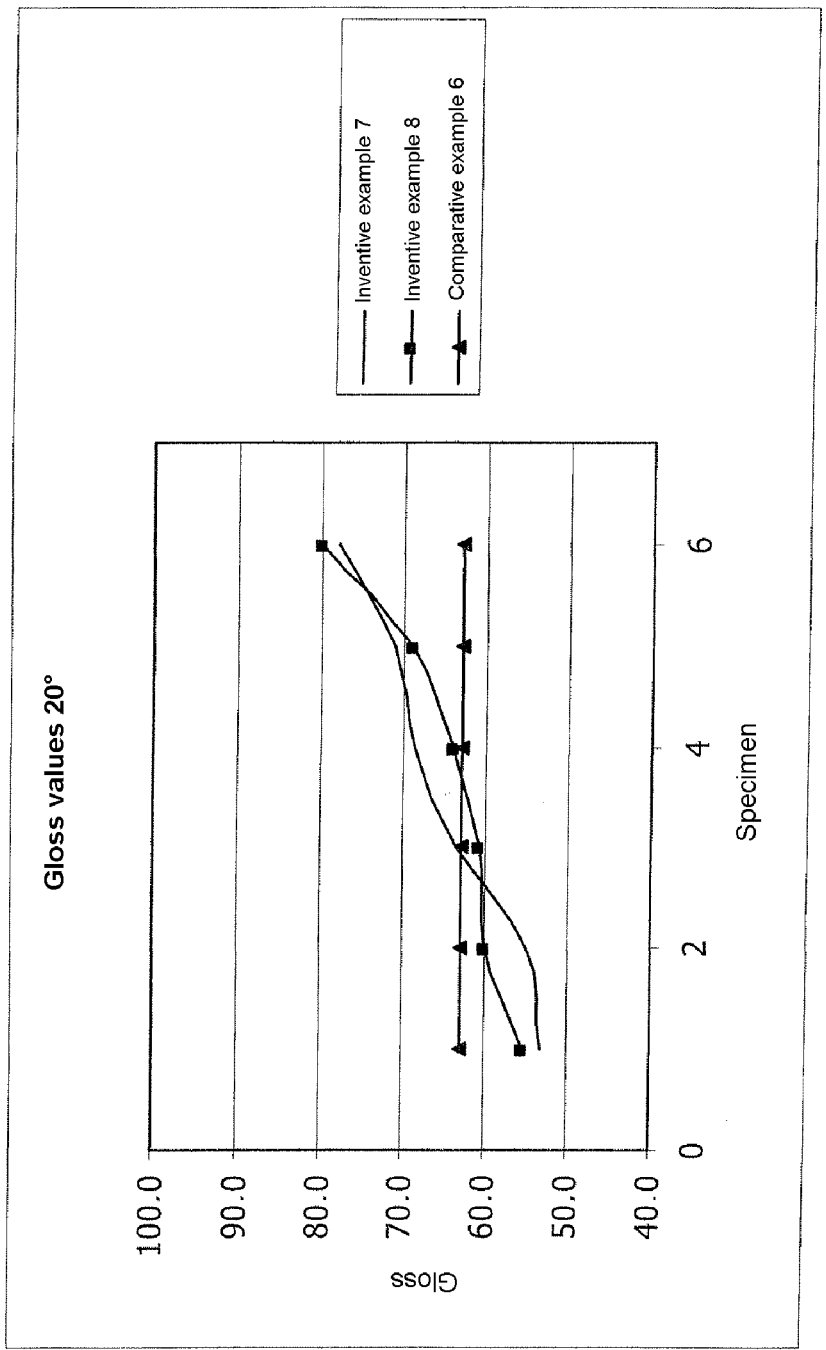
FIG. 6 shows the gloss values measured at a measurement angle of 20° with pigments obtained in the indicated examples.

The inventive examples 7 and 8 (table 7), in which glass flakes with a narrow span were coated first with an absorbing iron oxide (inventive example 7) and subsequently with $SiO_2$ and $Fe_2O_3$ (inventive example 6) or $SiO_2$ and $TiO_2$ (inventive example 8), showed significant gloss gains. For instance, a gloss gain of 14.9 units was found for the end product of inventive example 7, and a gloss gain of 17.1 units for the end product of inventive example 8 (FIG. 6).

An increase in the $Fe_2O_3$ layer thickness in comparative example 6 would lead to colored, nonsilver interference effects.

TABLE 7

Characterization of the effect pigments

| Effect pigment | Interim sample | Construction | Gloss, 20° | $C^*_{15}$ | Span |
|---|---|---|---|---|---|
| Comparative example 6 | | Glass/$Fe_2O_3$ | 62.9 | 4.1 | 1.1 |
| Inventive example 7 | 1 | Glass/$Fe_2O_3$/$SiO_2$/$Fe_2O_3$ | 53.2 | 1.5 | 1.1 |
| Inventive example 7 | 2 | Glass/$Fe_2O_3$/$SiO_2$/$Fe_2O_3$ | 54.9 | 2.2 | 1.1 |
| Inventive example 7 | 3 | Glass/$Fe_2O_3$/$SiO_2$/$Fe_2O_3$ | 63.6 | 2.4 | 1.1 |
| Inventive example 7 | 4 | Glass/$Fe_2O_3$/$SiO_2$/$Fe_2O_3$ | 68.4 | 2.6 | 1.1 |
| Inventive example 7 | 5 | Glass/$Fe_2O_3$/$SiO_2$/$Fe_2O_3$ | 71.0 | 3.2 | 1.1 |
| Inventive example 7 | End product | Glass/$Fe_2O_3$/$SiO_2$/$Fe_2O_3$ | 77.8 | 4.2 | 1.1 |
| Inventive example 8 | 1 | Glass/$Fe_2O_3$/$SiO_2$/$TiO_2$ | 55.3 | 2.8 | 1.1 |
| Inventive example 8 | 2 | Glass/$Fe_2O_3$/$SiO_2$/$TiO_2$ | 60.1 | 3.0 | 1.1 |
| Inventive example 8 | 3 | Glass/$Fe_2O_3$/$SiO_2$/$TiO_2$ | 60.7 | 3.9 | 1.1 |
| Inventive example 8 | 4 | Glass/$Fe_2O_3$/$SiO_2$/$TiO_2$ | 63.8 | 3.8 | 1.1 |
| Inventive example 8 | 5 | Glass/$Fe_2O_3$/$SiO_2$/$TiO_2$ | 69.0 | 4.1 | 1.1 |
| Inventive example 8 | End product | Glass/$Fe_2O_3$/$SiO_2$/$TiO_2$ | 80.0 | 3.0 | 1.1 |

With the mica-based inventive examples 9 and 10 as well, an extreme gloss increase effect, particularly in relation to the comparative examples 10 and 11 with the same layer construction, is observed on account of the narrow span (table 8). Also apparent here, furthermore, is the additional gloss increase arising from the multilayer technology [comparison of inventive example 9 (construction: mica/$TiO_2$/$SiO_2$/$TiO_2$) with comparative example 8 (construction: mica/$TiO_2$)].

TABLE 8

Characterization of the effect pigments

| Effect pigment | Construction | Gloss, 60° | $C^*_{15}$ | Span |
|---|---|---|---|---|
| Inventive example 9 | nat. mica/$TiO_2$/$SiO_2$/$TiO_2$ | 75.1 | 5.9 | 1.2 |
| Inventive example 10 | synth. mica/$Fe_2O_3$/$SiO_2$/$TiO_2$ | 58.2 | 16.2 | 1.2 |
| Comparative example 8 | nat. mica/$TiO_2$ | 69.0 | 8.9 | 1.2 |
| Comparative example 10 | nat. mica/$TiO_2$/$SiO_2$/$TiO_2$ | 18.6 | 16.8 | 3.7 |
| Comparative example 11 | synth. mica/$Fe_2O_3$/$SiO_2$/$TiO_2$ | 20.1 | 9.7 | 3.7 |

IV. Performance Examples

In the cosmetic application examples below, the inventive multilayer pearlescent pigments produced by one of the above examples were used.

Examples 11

Body Lotion Water-in-Silicone

| INCI name | Product name | wt % | Supplier |
|---|---|---|---|
| Phase A | | 100.00 | |
| Cyclopentasiloxane (and) dimethiconol | Dow Corning 1501 | 11.20 | www.dowcorning.com |
| Cyclopentasiloxane | Dow Corning 245 | 5.75 | www.dowcorning.com |
| Cyclopentasiloxane (and) PEG/PPG/-18/18 Dimethicone | Dow Corning 5225 C | 13.80 | www.dowcorning.com |
| C30-45 Alkyl Methicone | Dow Corning Cosmetic Wax AMS-C30 | 3.45 | www.dowcorning.com |
| Multilayer pearlescent pigment | Multilayer pearlescent pigment | 1.00 | |
| Phase B | | | |
| Polysorbate 20 | Tween 20 | 0.60 | www.uniqema.com |
| Phenoxyethanol (and) methylparaben (and) ethylparaben (and) butylparaben | Uniphen P-23 | 0.35 | www.induchem.com |

-continued

| INCI name | Product name | wt % | Supplier |
|---|---|---|---|
| Sodium chloride | Sodium chloride | 0.75 | www.vwr.com |
| Aqua | Water | 63.10 | |

The multilayer pearlescent pigment can be used in a range from 0.5% to 2.5% by weight. The balance can be made up with water.

Phase A was mixed and heated to 75° C., phase B was heated to 70° C. after mixing, and then phase B was added slowly, with homogenization, to phase A. With stirring, the emulsion was cooled and dispensed into an appropriate container.

Example 12

Body Powder

| INCI name | Product name | wt % | Supplier |
|---|---|---|---|
| Phase A | | 100.00 | |
| Mica | Silk Mica | 40.70 | www.vwr.com |
| Talc | Talc Powder | 18.00 | www.riedeldehaen.com |
| Boron nitride | Softouch CCS 102 | 5.00 | www.advceramics.com |
| Nylon-12 | Orgasol 2002 D/Nat | 8.00 | www.atofinachemicals.com |
| Magnesium stearate | Magnesium stearate | 6.00 | www.sigmaaldrich.com |
| Methylparaben, propylparaben | Rokonsal SSH-1 | 0.30 | www.biochema.com |
| Mica (and) iron oxides | Prestige Soft Bronze | 9.00 | www.eckart.net |
| Multilayer pearlescent pigment | Multilayer pearlescent pigment | 2.00 | |
| Mica (and) titanium dioxide | Prestige Magic Orange | 9.00 | www.eckart.net |
| Phase B | | | |
| Tridecyl stearate (and) tridecyl trimellitate (and) dipentaerythrityl hexacaprylate/hexacaprate | Lipovol MOS-130 | 2.00 | www.lipochemicals.com |

The multilayer pearlescent pigment can be used in a range from 0.2% to 5.0% by weight. The balance can be made up with mica.

The ingredients of phase A were mixed together, and then phase B was added to phase A. After mixing, dispense into a vessel.

Example 13

Cream Eyeshadow

| INCI name | Product name | wt % | Supplier |
|---|---|---|---|
| Phase A | | 100.00 | |
| Castor oil | Castor oil | 31.70 | www.riedeldehaen.com |
| Octyl palmitate | Liponate EHP | 6.00 | www.lipochemicals.com |
| Cocos Nucifera (coconut) oil | Lipovol C-76 | 7.00 | www.lipochemicals.com |

-continued

| INCI name | Product name | wt % | Supplier |
|---|---|---|---|
| Beeswax | Ewacera 12 | 6.00 | www.wagnerlanolin.com |
| Isopropyl lanolate | Ewalan IP | 5.00 | www.wagnerlanolin.com |
| Persea gratissima (avocado) oil and hydrogenated avocado oil | Avocado butter | 7.00 | www.impag.de |
| Magnesium stearate | Magnesium stearate | 3.00 | www.sigmaaldrich.com |
| Bis-hydroxyethoxy-propyl dimethicone | Dow Corning 5562 carbinol fluid | 7.00 | www.dowcorning.com |
| Dimethicone/vinyl dimethicone crosspolymer and silica | Dow Corning 9701 cosmetic powder | 5.00 | www.dowcorning.com |
| Phenoxyethanol (and) methylparaben (and) ethylparaben (and) butylparaben | Uniphen P-23 | 0.30 | www.induchem.com |
| Phase B | | | |
| Mica (and) iron oxides | Prestige soft bronze | 21.00 | www.eckart.net |
| Multilayer pearlescent pigment | Multilayer pearlescent pigment | 1.00 | |

The multilayer pearlescent pigment can be used in a range from 0.1% to 5.0% by weight. The balance can be made up with castor oil.

Phase A was mixed and heated to 85° C., the ingredients of phase B were likewise mixed together, and then were added to phase A with stirring. After being dispensed into an appropriate container, the mixture was cooled to room temperature.

Example 14

Foundation

| INCI name | Product name | wt % | Supplier |
|---|---|---|---|
| Phase A | | 100.00 | |
| Hydrogenated polydecene | Ritadecene 20 | 9.00 | www.ritacorp.com |
| Caprylic/Capric triglyceride | Liponate GC-K | 5.00 | www.lipochemicals.com |
| Prunus Amygdalus Dulcis (sweet almond) oil | Sweet almond oil | 4.00 | www.jandekker.com |
| Caprylyl trimethicone | SilCare Silicone 31M50 | 4.00 | www.clariant.com |
| Caprylyl methicone | SilCare silicone 41M15 | 3.00 | www.clariant.com |
| Steareth-2 | Volpo S2 | 1.60 | www.croda.com |
| Steareth-20 | Sympatens AS/200 G | 2.40 | www.kolb.ch |
| Phase B | | | |
| Talc | Talc powder | 4.50 | www.vwr.com |
| Mica (and) iron oxides | Prestige soft beige | 4.00 | www.eckart.net |
| Mica (and) titanium dioxide | Prestige soft silver | 1.00 | www.eckart.net |
| Multilayer pearlescent pigment | Multilayer pearlescent pigment | 0.50 | |
| Phase C | | | |
| Glycerin | Pricerine 9090 | 5.00 | www.brenntag.com |
| Aqua | Water | 55.20 | |
| Ammonium acryloyl-di-methyltaurate/VP copolymer | Aristoflex AVC | 0.40 | www.simon-und-werner.com |
| Phase D | | | |
| Propylene glycol (and) diazolidinyl urea (and) methylparaben (and) propylparaben | Nipaguard PDU | 0.40 | www.simon-und-werner.com |

The multilayer pearlescent pigment can be used in a range from 0.1% to 1.0% by weight. The balance can be made up with water.

Phase A and phase B were weighed out separately. Phase A was heated to 70° C. with stirring, and phase B was added with stirring. Phase C was mixed thoroughly until the Aristoflex had dissolved, and then was likewise heated to 70° C. Phase C was added to phase AB and, after cooling to 40° C., phase D was added.

Example 15

Hair Gel

| INCI name | Product name | wt % | Supplier |
|---|---|---|---|
| Phase A | | 100.00 | |
| Multilayer pearlescent pigment | Multilayer pearlescent pigment | 0.10 | |
| Ammonium acryloyldimethyl-taurate/VP copolymer | Aristoflex AVC | 1.40 | www.clariant.com |
| Citric acid | Citric acid | 0.10 | www.vwr.com |
| Aqua | Water | 55.10 | |
| Phase B | | | |
| PVP | Luviskol K30 powder | 1.50 | www.basf.com |
| Propylene glycol, diazolidinyl, urea, methylparaben, propylparaben | Germaben II | 0.20 | www.ispcorp.com |
| Triethanolamine | Triethanolamine | 1.20 | www.vwr.com |
| Water | Aqua | 40.40 | |

The multilayer pearlescent pigment can be used in a range from 0.01% to 0.5% by weight. The balance can be made up with water.

The multilayer pearlescent pigment was stirred together with the water of phase A, Aristoflex AVP and citric acid were added with stirring, and the composition was mixed for 15 minutes at a speed of 800 rpm. The ingredients of phase B were dissolved until a homogeneous solution was produced, and then phase B was added to phase A, and the composition was mixed.

Example 16

Hair Mascara

| INCI name | Product name | wt % | Supplier |
|---|---|---|---|
| Phase A | | 100.00 | |
| Polyquaternium-16 | Luviquat FC 905 (Luviquat Excellence) | 2.70 | www.basf.com |
| Propylene glycol | 1,2-propanediol | 1.80 | www.vwr.com |
| Methylparaben | Methyl-4-hydroxybenzoate | 0.20 | www.sigmaaldrich.com |
| Aqua | Water | 64.45 | |
| Phase B | | | |
| Cetearyl alcohol | Lanette O | 5.00 | www.cognis.com |
| Dimethicone | Dow Corning 200 fluid/350 cst | 1.00 | www.dowcorning.com |

-continued

| INCI name | Product name | wt % | Supplier |
|---|---|---|---|
| Ceteareth-25 | Cremophor A 25 | 2.00 | www.basf.com |
| Propylparaben | Propyl-4-hydroxybenzoate | 0.10 | www.sigmaaldrich.com |
| Phase C | | | |
| Hydroxypropylcellulose | Klucel G | 0.50 | www.herc.com |
| Magnesium aluminium silicate | Veegum HV | 0.50 | www.rtvanderbilt.com |
| Aqua | Wawter | 19.00 | |
| Phase D | | | |
| Multilayer pearlescent pigment | Multilayer pearlescent pigment | 2.50 | |
| Phenoxyethanol (and) methylparaben (and) butylparaben (and) ethylparaben (and) propylparaben (and) isobutylparaben | Phenonip | 0.20 | www.clariant.com |
| Fragrance | Blue shadow ÖKO | 0.05 | www.bell-europe.com |

The multilayer pearlescent pigment can be used in a range from 0.5% to 5.0% by weight. The balance can be made up with water of phase A.

Phase A and phase B were heated separately to 80° C., and then phase B was added slowly to phase A. In a separate vessel, Klucel and Veegum were added to the water of phase C. Then phase AB was cooled to 40° C. and, in the course of cooling, phases C and D were mixed in with stirring.

Example 17

Lip Gloss

| INCI name | Product name | wt % | Supplier |
|---|---|---|---|
| Phase A | | 100.00 | |
| Hydrogenated polyisobutene (and) ethylene/propylene/styrene copolymer (and) butylene/ethylene/styrene copolymer | Versagel ME 750 | 79.00 | www.penreco.com |
| Simmondsia Chinensis (jojoba) seed oil | Jojoba oil - natural/golden | 2.00 | www.biochemica.com |
| Caprylyl trimethicone | Silcare Silicone 31M50 | 7.00 | www.clariant.com |
| Stearyl dimethicone | Silcare Silicone 41M65 | 3.20 | www.clariant.com |
| Hydrogenated polydecene | Nexbase 2002 | 4.00 | www.jandekker.com |
| Isopropyl myristate | Isopropyl myristate | 4.50 | www.vwr.com |
| Phase B | | | |
| Multilayer pearlescent pigment | Multilayer pearlescent pigment | 0.10 | |
| Propylparaben | Propyl-4-hydroxy-benzoate | 0.20 | www.sigmaaldrich.com |

The multilayer pearlescent pigment can be used in a range from 0.01% to 0.50% by weight. The balance can be made up with Versagel ME 750.

Phase A was heated to 85° C., and then the ingredients of phase B were added individually to phase A and the mixture was stirred until its consistency was uniform, at which point it was dispensed into a lip gloss vessel.

Example

Lip Liner

| INCI name | Product name | wt % | Supplier |
|---|---|---|---|
| Phase A | | 100.00 | |
| Hydrogenated cocoglycerides | Softisan 100 | 12.35 | www.sasolwax.com |
| Candelilla wax | Ewacera 42 | 14.00 | www.wagnerlanolin.de |
| Magnesium stearate | Magnesium stearate | 6.00 | www.sigmaaldrich.com |
| Stearic acid | Kortacid 1895 | 8.50 | www.akzonobel.com |
| Hydrogenated coconut oil | Lipex 401 | 8.00 | www.karlshamns.com |
| Cetyl palmitate | Walrath synthetic | 7.00 | www.kahlwax.de |
| Caprylic/capric triglyceride | Liponate GC-K | 3.60 | www.lipochemicals.com |
| Soybean glycerides (and) Butyrospermum Parkii | Lipex L'sens | 15.00 | www.karlshamns.com |
| Tocopheryl acetate | D,L-alpha-tocopherol acetate | 0.25 | www.dsm.com |
| Methylparaben; propylparaben | Rokonsal SSH-1 | 0.30 | www.biochema.com |
| Phase B | | | |
| Mica (and) titanium dioxide (and) ferric ferrocyanide | Prestige Sapphire | 7.50 | www.eckart.net |
| Mica (and) iron oxides | Prestige copper | 7.50 | www.eckart.net |

-continued

| INCI name | Product name | wt % | Supplier |
|---|---|---|---|
| Mica (and) titanium dioxide | Prestige soft silver | 5.00 | www.eckart.net |
| Multilayer pearlescent pigment | Multilayer pearlescent pigment | 5.00 | |

The multilayer pearlescent pigment can be used in a range from 0.5% to 10% by weight. The balance can be made up with other pigments; the pigmentation must be kept at 25% by weight.

Phase A was heated to 85° C., and then phase B was added to phase A with stirring, until the composition was uniform. Thereafter the mixture was introduced hot into a stick mold.

Example 19

Lipstick

| INCI name | Product name | wt % | Supplier |
|---|---|---|---|
| Phase A | | 100.00 | |
| Carnauba wax | Ewacera 34 | 4.50 | www.wagnerlanolin.de |
| Beeswax | Ewacera 12 | 3.50 | www.wagnerlanolin.de |
| Candelilla wax | Ewacera 42 | 4.00 | www.wagnerlanolin.de |
| Microcrystalline wax | Parcera MW | 7.20 | www.paramelt.com |
| Cetyl palmitate | Walrath synthetic | 2.00 | www.kahlwax.de |
| Hydrogenated cocoglycerides | Softisan 100 | 5.00 | www.sasolwax.com |
| Petrolatum | Penreco blond | 5.80 | www.penreco.com |
| Cetearyl octanoate | Luvitol EHO | 10.70 | www.basf.com |
| Tocopheryl acetate | D,L-alpha-tocopherol acetate | 0.50 | www.dsm.com |
| Castor oil | Castor oil | 36.60 | www.riedeldehaen.com |
| Phase B | | | |
| Mica (and) iron oxide | Prestige Fire-red | 16.00 | www.eckart.net |
| Multilayer pearlescent pigment | Multilayer pearlescent pigment | 5.00 | |
| Methylparaben, propylparaben | Rokonsal SSH-1 | 0.20 | www.biochema.com |

The multilayer pearlescent pigment can be used in a range from 0.5% to 10.0% by weight. The balance can be made with other pigments; the pigmentation must be kept at 21% by weight.

Phase A was heated to 85° C., after which phase B was added to phase A and the composition was mixed. The mixture was then dispensed at a temperature of 75° C. into a lipstick mold.

Example 20

Liquid Eyeliner

| INCI name | Product name | wt % | Supplier |
|---|---|---|---|
| Phase A | | 100.00 | |
| Aqua | Water | 64.70 | |
| Water/carbon black dispersion | MBD 201 | 3.00 | www.geotech.nl |
| Acrylates copolymer | Covacryl E14 | 10.00 | www.lcw.fr |
| Magnesium aluminium silicate | Veegum HV | 1.00 | www.cherbsloeh.de |
| Phase B | | | |
| Propylene glycol | 1,2-Propanediol | 3.00 | www.vwr.com |
| Triethanolamine | Triethanolamine | 1.40 | www.vwr.com |
| Phase C | | | |
| Xanthan gum | Keltrol T | 0.30 | www.cpkelco.com |
| Phase D | | | |
| Multilayer pearlescent pigment | Multilayer pearlescent pigment | 5.00 | |
| Mica | Silk mica | 2.00 | www.vwr.com |
| Phase E | | | |
| Stearic acid | Kortacid 1895 | 2.80 | www.akzonobel.de |
| Glyceryl stearate | Aldo MS K FG | 0.80 | www.lonza.com |
| Oleyl alcohol | HD-ocenol 90/95 V | 0.50 | www.biesterfeld.com |
| Phenoxyethanol (and) methylparaben (and) ethylparaben (and) butylparaben | Uniphen P-23 | 0.50 | www.induchem.com |
| Phase F | | | |
| Dimethicone (and) trisiloxane | Dow Corning 2-1184 Fluid | 5.00 | www.dowchemicals.com |

The multilayer pearlescent pigment can be used in a range from 0.5% to 8.0% by weight. The balance can be made up with water.

Veegum was dispersed in phase A and stirred for 15 minutes, after which phase B was added to phase A, and then phase C was added to phase AB, followed by stirring for 10 minutes more. Subsequently, phase D was added to phase ABC, and the mixture was heated to 75° C.; phase E was likewise heated to 75° C., and then added to phase ABCD. After cooling to 60° C., phase F was added, and the composition was dispensed into a suitable vessel.

What is claimed is:

1. Multilayer pearlescent pigments with a silver interference color, based on platelet-shaped transparent substrates with an optically active coating, wherein the optically active coating comprises at least
   a) a high-index layer A having a refractive index n ≥1.8;
   b) a low-index layer B having a refractive index n <1.8;
   c) a high-index layer C having a refractive index n ≥1.8;

and also, d) optionally an outer protective layer D and wherein the multilayer pearlescent pigments have the indices $D_{10}$, $D_{50}$, $D_{90}$ from the cumulative frequency distribution of the volume-averaged size distribution function, with a span $\Delta D$ of 0.7 -1.4, the span $\Delta D$ being calculated in accordance with the formula $\Delta D = (D_{90} - D_{10})/D_{50}$, wherein said multilayer pearlescent pigments have chroma values $C^*_{15} \leq 20$.

2. The multilayer pearlescent pigments with a silver interference color of claim 1, wherein at least one of layer A and layer C independently of one another are at least one of selectively and nonselectively absorbing or nonabsorbing.

3. The multilayer pearlescent pigments with a silver interference color of claim 1, wherein layer B is nonabsorbing.

4. The multilayer pearlescent pigments with a silver interference color of claim 1, wherein the multilayer pearlescent pigments have a span $\Delta D$ of 0.7 -1.3.

5. The multilayer pearlescent pigments with a silver interference color of claim 1, wherein the optical layer thickness of layer A and layer C is in each case in the range from 50 to 200 nm.

6. The multilayer pearlescent pigments with a silver interference color of claim 1, wherein the optical layer thickness of layer B is in the range from 30 to 150 nm.

7. The multilayer pearlescent pigments with a silver interference color of claim 1, wherein at least one of layer A and layer C comprises at least one of titanium dioxide and iron oxide.

8. The multilayer pearlescent pigments with a silver interference color of claim 1, wherein layer B comprises silicon dioxide.

9. The multilayer pearlescent pigments with a silver interference color of claim 1, wherein the platelet-shaped transparent substrates of the multilayer pearlescent pigments with a silver interference color are selected from the group consisting of natural mica, synthetic mica, glass flakes, $SiO_2$ platelets, $Al_2O_3$ platelets, and mixtures thereof.

10. The multilayer pearlescent pigments with a silver interference color of claim 1, wherein the multilayer pearlescent pigments have a chroma $C^*_{15}$ of $\leq 17$.

11. A method for producing the multilayer pearlescent pigments with a silver interference color of claim 1, wherein said method comprises the following steps:

i) size-classifying the platelet-shaped transparent substrates to be coated; and ii) coating the platelet-shaped transparent substrates with at least layers A to C and also, optionally, layer D.

12. A preparation which comprises the multilayer pearlescent pigments of claim 1.

13. An article which is coated with the multilayer pearlescent pigments of claim 1.

\* \* \* \* \*